US012194616B2

(12) United States Patent
Hong

(10) Patent No.: US 12,194,616 B2
(45) Date of Patent: Jan. 14, 2025

(54) ROBOT AND CONTROL METHOD THEREFOR

(71) Applicant: SAMSUNG ELECTRONICS CO., LTD., Suwon-si (KR)

(72) Inventor: Soonhyuk Hong, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 317 days.

(21) Appl. No.: 16/973,354

(22) PCT Filed: Aug. 30, 2019

(86) PCT No.: PCT/KR2019/011133
§ 371 (c)(1),
(2) Date: Dec. 8, 2020

(87) PCT Pub. No.: WO2020/046038
PCT Pub. Date: Mar. 5, 2020

(65) Prior Publication Data
US 2021/0213619 A1 Jul. 15, 2021

(30) Foreign Application Priority Data
Aug. 30, 2018 (KR) .......... 10-2018-0102689

(51) Int. Cl.
G05D 1/02 (2020.01)
A47L 9/28 (2006.01)
(Continued)

(52) U.S. Cl.
CPC ......... *B25J 11/0085* (2013.01); *A47L 9/2852* (2013.01); *A47L 2201/04* (2013.01);
(Continued)

(58) Field of Classification Search
CPC .... B25J 11/0085; B25J 9/1666; B25J 19/023; B25J 9/1676; A47L 9/2852;
(Continued)

(56) References Cited

U.S. PATENT DOCUMENTS 7,386,163 B2   6/2008  Sabe et al.
8,983,130 B2   3/2015  Yasugi et al.
(Continued)

FOREIGN PATENT DOCUMENTS

EP   3 367 199 B1   8/2018
EP   3 546 139 A1   10/2019
(Continued)

OTHER PUBLICATIONS

Office Action (issuance date: Nov. 18, 2022) issued by the Korean Patent Office for Korean Patent Application No. 10-2018-0102689.
(Continued)

*Primary Examiner* — Adam R Mott
*Assistant Examiner* — Byron Xavier Kasper
(74) *Attorney, Agent, or Firm* — Sughrue Mion, PLLC

(57) ABSTRACT

The present invention relates to a robot and a control method therefor and, more particularly, to a robot and a control method therefor, the robot detecting peripheral obstacles and structures by using an image in front of same, thereby providing an efficient and safe moving path. A robot control method according to one embodiment of the present invention comprises the steps of: capturing an image; acquiring a first image of which the bottom surface is separated in the image; recognizing obstacles included in the image by using a learned first artificial intelligence model; allowing a robot to acquire and store a second image in order to perform a task on the basis of the information about the first image and the region including the recognized obstacles; and allowing the robot to move on the basis of the second image.

18 Claims, 23 Drawing Sheets

(51) Int. Cl.
*A47L 11/40* (2006.01)
*B25J 9/16* (2006.01)
*B25J 11/00* (2006.01)
*B25J 13/08* (2006.01)
*G05D 1/243* (2024.01)
*G05D 1/246* (2024.01)
*G05D 1/622* (2024.01)
*G05D 1/648* (2024.01)
*G06V 10/70* (2022.01)
*B25J 19/02* (2006.01)
*G05D 1/00* (2006.01)

(52) U.S. Cl.
CPC ............ *B25J 9/1666* (2013.01); *B25J 19/023* (2013.01); *G05D 1/0246* (2013.01)

(58) Field of Classification Search
CPC .. A47L 2201/04; A47L 9/2805; A47L 9/2857; A47L 9/2894; A47L 11/4011; A47L 11/4061; A47L 11/24; A47L 7/0066; A47L 7/0071; A47L 7/0085; A47L 7/009; G05D 1/0246; G05D 2201/0203; G05D 1/0088; G05D 1/0274
See application file for complete search history.

(56) References Cited

U.S. PATENT DOCUMENTS

| | | | |
|---|---|---|---|
| 9,504,369 B2 | 11/2016 | So et al. | |
| 9,682,483 B1* | 6/2017 | Romano | B25J 11/0085 |
| 9,701,016 B1* | 7/2017 | Urata | G01S 17/50 |
| 10,437,252 B1* | 10/2019 | Liu | G01C 21/3878 |
| 11,330,948 B2 | 5/2022 | Noh et al. | |
| 2015/0032260 A1* | 1/2015 | Yoon | B25J 11/0085 700/257 |
| 2015/0088310 A1* | 3/2015 | Pinter | B25J 9/1676 901/1 |
| 2016/0307070 A1 | 10/2016 | Jiang et al. | |
| 2017/0364088 A1* | 12/2017 | Grufman | G05D 1/0219 |
| 2018/0114064 A1* | 4/2018 | Schnittman | G06V 20/64 |
| 2018/0210445 A1* | 7/2018 | Choi | G05D 1/0274 |
| 2018/0242806 A1 | 8/2018 | Haegermarck | |
| 2019/0061157 A1* | 2/2019 | Suvarna | G05D 1/0044 |
| 2019/0187703 A1* | 6/2019 | Millard | G05D 1/249 |
| 2019/0196480 A1* | 6/2019 | Taylor | G05D 1/0223 |
| 2019/0202449 A1* | 7/2019 | Taveira | G08G 5/045 |
| 2019/0320867 A1 | 10/2019 | Noh et al. | |
| 2022/0265106 A1 | 8/2022 | Noh et al. | |

FOREIGN PATENT DOCUMENTS

| | | | | |
|---|---|---|---|---|
| JP | 2008200770 A | * | 9/2008 | ............ G05D 1/024 |
| JP | 2011-134226 A | | 7/2011 | |
| KR | 100825919 B1 | * | 4/2008 | ............ B25J 9/1664 |
| KR | 10-2014-0133369 A | | 11/2014 | |
| KR | 10-2017-0061373 A | | 6/2017 | |
| KR | 10-2018-0014535 A | | 2/2018 | |
| KR | 10-2018-0048705 A | | 5/2018 | |
| KR | 10-2018-0058511 A | | 6/2018 | |
| WO | WO-2018097574 A1 | * | 5/2018 | .......... A47L 11/4011 |

OTHER PUBLICATIONS

Examination Report (issuance date: Jan. 20, 2023) issued by the European Patent Office for European Patent Application No. 19853500.7.

International Search Report (PCT/ISA/210) issued by the International Searching Authority in International Application No. PCT/KR2019/011133, issued on Dec. 17, 2019.

Written Opinion (PCT/ISA/237) issued by the International Searching Authority in International Application No. PCT/KR2019/011133, issued on Dec. 17, 2019.

KR Communication issued May 16, 2023 by the Korean Patent Office in Korean Patent Application No. 10-2018-0102689.

Communication dated May 25, 2021, issued by the European Patent Office in counterpart European Application No. 19853500.7.

* cited by examiner

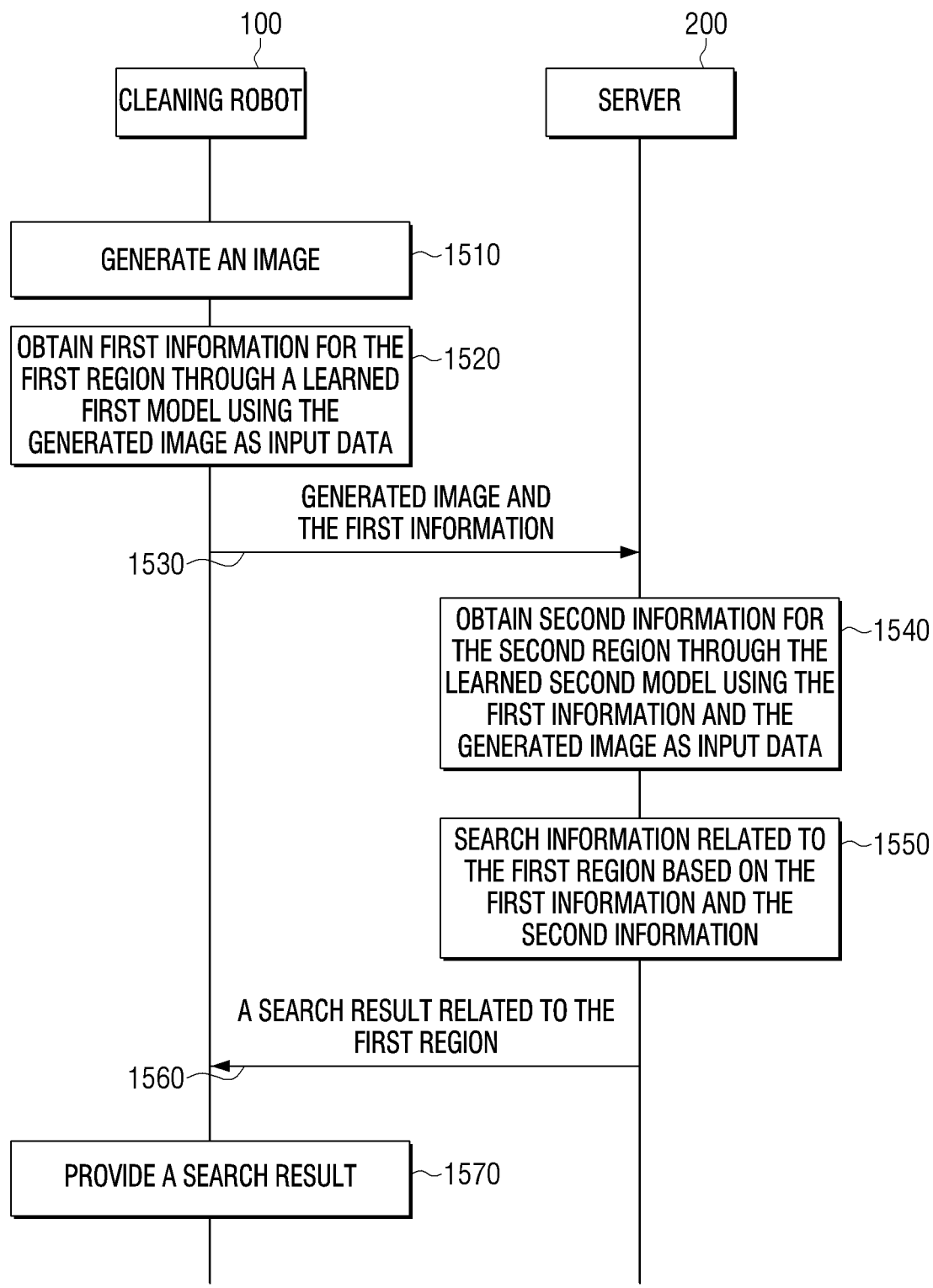

ROBOT AND CONTROL METHOD THEREFOR

TECHNICAL FIELD

This disclosure relates to a robot and a control method therefor. More particularly, this disclosure relates to a robot capable of grasping adjacent obstacles and structures using a front image of a robot, thereby providing a moving patch efficiently and safely, and a control method therefor.

BACKGROUND ART

According to the development of the robot technology, supply of a robot become popular to not only a specialized technical field or an industrial field requiring large labor power, but also a general household. A service robot, a cleaning robot, and a pet robot for providing a housework service to a user are widely used.

In particular, in the case of a cleaning robot, it is very important to check a cleanable area and safely clean a large area. A related-art cleaning robot performs an avoidance travel having only information about whether obstacles and structures are present in a nearby distance due to a limited sensor combination and a sensing range. Accordingly, since the related-art cleaning robot cannot perform efficient cleaning utilizing a wide cleaning area, and a user of the cleaning robot can feel uncomfortable with the cleaning robot which moves differently from the intention of the user.

Since the related-art cleaning robot performs cleaning without separating the structures and the surrounding obstacles, the related-art cleaning robot approaches obstacles until the obstacles are detected by a local sensor as well as the structures. Accordingly, there is a problem that sensitive obstacles may be damaged by the cleaning robot.

DISCLOSURE

Technical Problem

The disclosure has been made to solve the above-described problems, and an object of the disclosure is to provide a cleaning robot, which can provide a user with a smooth service by distinguishing neighboring obstacles and structures by using an image of a front camera of a cleaning robot, and accurately recognizing information on a movable area, and a control method therefor.

Technical Solution

A control method of a robot to provide the service described above may include capturing an image; obtaining a first image which segments a floor surface from the image; recognizing an obstacle included in the image using a trained first artificial intelligence model; obtaining and storing a second image for the robot to perform a task based on the first image and information on a region including the recognized obstacle; and moving the robot based on the second image.

The method may further include obtaining moving state information and capturing direction information of the robot which captures an image, and the storing may further include storing the moving state information and the direction information together with the second image.

The method may further include identifying a distance between the robot and a wall using the second image and the moving state information.

The method may further include determining a moving speed of the robot based on the distance to the wall.

The method may further include generating a navigation map of a movable region of the robot using the second image stored together with the moving state information and the capturing direction information.

The method may further include identifying a position of a robot and establishing a moving plan using the navigation map and the second image stored together with the capturing direction information.

The obtaining the first image may include obtaining the first image using a second artificial intelligence model trained to detect a floor surface region in the image.

A size of the region including the obstacle may vary according to a type of an obstacle recognized by the first artificial intelligence model.

The method may further include obtaining a depth map image including depth information of the captured image; obtaining and storing a third image for the cleaning robot to perform a task based on the depth map image and information about a region including the recognized obstacle; and moving the robot based on the third image.

A robot for cleaning to provide the service described above according to an embodiment may include a camera; a driver; a memory; and a processor configured to control the camera to capture an image, obtain a first image which segments a floor surface from the image, recognize an obstacle included in the image using a trained first artificial intelligence model, obtain and store a second image for the robot to perform a task based on the first image and information on a region including the recognized obstacle in the memory, and control the driver so that the robot moves based on the second image.

The robot may further include a sensor, and the processor is further configured to, based on obtaining moving state information and capturing direction information of the robot which captures an image through the sensor, store the moving state information and the direction information together with the second image in the memory.

The processor is further configured to identify a distance between the robot and a wall using the second image and the moving state information.

The processor is further configured to determine a moving speed of the robot based on the distance to the wall.

The processor is further configured to generate a navigation map of a movable region of the robot using the second image stored together with the moving state information and the capturing direction information and store the same in the memory.

The processor is further configured to identify a position of a robot and establish a moving plan using the navigation map and the second image stored together with the capturing direction information.

The processor may obtain the first image using a second artificial intelligence model trained to detect a floor surface region in the image.

The processor may change the size of the region including the obstacle according to a type of the obstacle recognized through the first artificial intelligence model.

The processor may obtain a depth map image including depth information of the captured image, obtain and store a third image for the cleaning robot to perform a task based on the depth map image and information about a region including the recognized obstacle and control the driver to allow the robot move based on the third image.

Effect of Invention

According to various embodiments, a cleaning robot may accurately find obstacles and structures, and may provide an efficient service using a wide space.

DESCRIPTION OF DRAWINGS

FIG. 15 is a flowchart of a system using a recognition model according to an embodiment.

BEST MODE FOR CARRYING OUT THE INVENTION

Figure 1:
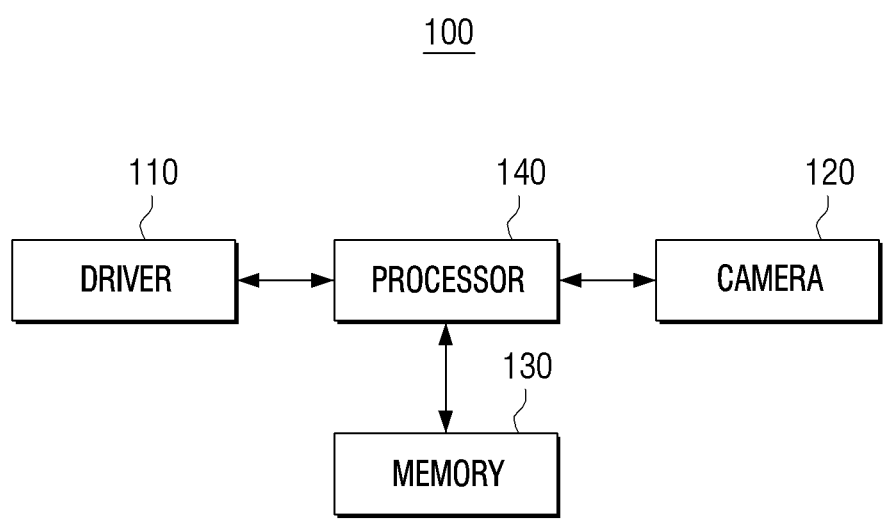
FIG. 1 is a diagram illustrating an electronic system according to an embodiment.

Various example embodiments of the disclosure will be described with reference to the accompanying drawings. However, it may be understood that the disclosure is not limited to the embodiments described hereinafter, but also includes various modifications, equivalents, and/or alternatives of these embodiments. In relation to explanation of the drawings, similar drawing reference numerals may be used for similar constituent elements.

In the description, the terms "first, second, and so forth" are used to describe diverse elements regardless of their order and/or importance and to discriminate one element from other elements, but are not limited to the corresponding elements. For example, a first user appliance and a second user appliance may indicate different user appliances regardless of their order or importance. For example, without departing from the scope as described herein, a first element may be referred to as a second element, or similarly, a second element may be referred to as a first element.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it may be understood that there is no other element (e.g., a third element) between the other elements.

The terms used in the description are used to describe an embodiment, but may not intend to limit the scope of other embodiments. Unless otherwise defined specifically, a singular expression may encompass a plural expression. All terms (including technical and scientific terms) used in the description could be used as meanings commonly understood by those ordinary skilled in the art to which the disclosure belongs. The terms that are used in the disclosure and are defined in a general dictionary may be used as meanings that are identical or similar to the meanings of the terms from the context of the related art, and they are not interpreted ideally or excessively unless they have been clearly and specially defined. According to circumstances, even the terms defined in the embodiments of the disclosure may not be interpreted as excluding the embodiments of the disclosure.

Hereinafter, various embodiments will be described in detail with reference to the accompanying drawings. FIG. 1 is a simplified block diagram illustrating a configuration of a cleaning robot 100 according to an embodiment. Referring to FIG. 1, the cleaning robot 100 may include a driver 110, a camera 120, a memory 130, and a processor 140.

The cleaning robot 100 is a device which moves itself and provides a cleaning service to a user and may be implemented with various types of electronic devices. For example, the cleaning robot 100 may be implemented in various shapes such as a cylindrical shape, a cuboid shape, or the like, for various purposes, such as a home cleaning robot, a cleaning robot for cleaning a large building, a cleaning robot for an airport, or the like. According to an embodiment, the cleaning robot 100 may perform a task of simply removing foreign matters from a floor, but also perform tasks to move an object according to a user command.

A driver 110 can drive the cleaning robot 100. For example, the driver 110 can move the cleaning robot 100 to a position to perform a task by the control of the processor 140. In this case, the driver 110 may include at least one wheel in contact with a floor surface, a motor providing power to the wheel, and a driver for controlling the motor. In another example, the driver 110 may implement an operation for performing a task. In the case of an object moving task, the driver 110 may include a motor for performing an operation to pick the object, or the like.

A camera 120 is configured to capture an image around the cleaning robot 100 in various aspects. The camera 120 may capture an image in front of the cleaning robot 100 or capture an image about a direction which is different from a travel direction.

The camera 120 is configured to include a plurality of cameras. The camera 120 may be installed in an upper portion or a front portion of the cleaning robot 100 and may be installed in at least one of the upper portion or the front portion.

The memory 130 may store an image captured by the camera 120, moving state information and capturing direction information of the cleaning robot 100 at the time of capturing. The memory 130 can store navigation map information for a place for the cleaning robot 100 to perform a task. This is only one embodiment, and the memory 130 can store various programs, or the like, needed to operate the cleaning robot 100.

The memory 130 may store a plurality of application programs (or applications) running on the cleaning robot 100, data for operation of the cleaning robot 100, and instructions. At least some of the application programs may be downloaded from an external server via wireless communication. At least a part of the application program may be present on the cleaning robot 100 from the time of release for a basic function of the cleaning robot 100. The application program may be stored in the memory 130 and may be driven to perform an operation (or function) of the cleaning robot 100 by the processor 140.

The memory 130 may be implemented as a non-volatile memory, a volatile memory, a flash memory, a hard disk drive (HDD), a solid state drive (SSD), or the like. The memory 130 is accessed by the processor 140 and reading, writing, modifying, deleting, or updating of data by the processor 140 may be performed. In the disclosure, the term memory may include the memory 130, read-only memory (ROM) in the processor 140, random access memory (RAM), or a memory card (for example, a micro secure digital (SD) card, and a memory stick) mounted to the cleaning robot 100.

The processor 140 can control the overall configuration of the cleaning robot 100. For example, the processor 140 can control the camera 120 to capture images around the cleaning robot 100. The processor 140 can generate a first image which divides a bottom surface in a captured image based on features. At this time, the processor 140 can use an image division technique to divide the bottom surface. This will be described in more detail later.

The processor 140 can recognize obstacles included in an image through a first artificial intelligence model learned to recognize an object such as obstacles. That is, the processor 140 may input an image including obstacles in the first artificial intelligence model and obtain an output result including information on the obstacles type. The processor 140 can determine the size of different access forbidden regions according to the type of obstacles. At this time, the access forbidden region is an area including obstacles and may refer to a region that the cleaning robot 100 should not access when performing a cleaning task. The first artificial intelligence model may be trained and stored in the memory 130 or stored in the external server. This will be described in detail later. Hereinafter, an embodiment of storing the first artificial intelligence model in the cleaning robot 100 will be described.

The processor 140 can generate a second image overlapping the first image with an access forbidden region for the recognized obstacles. The processor 140 can recognize the locations of the structures and obstacles around the cleaning robot 100 based on the information included in the second image, and can determine the direction and speed to which the cleaning robot 100 is to move. The processor 140 can control the driver 110 to move the cleaning robot 100 according to the determined movement direction and speed.

The processor 140 may include a central processing unit (CPU), a random access memory (RAM), and a read-only memory (ROM), and a system bus. Here, the ROM stores an instruction set for booting the system. The CPU copies the operating system stored in the memory of the cleaning robot 100 to the RAM according to the instructions stored in the ROM, and executes the O/S to boot the system. When booting is completed, the CPU copies various applications stored in the memory 130 to the RAM and executes various operations. Although the processor 140 has been described as including only one CPU, the processor 140 may be implemented with a plurality of CPUs (or a digital signal processor (DSP), system on chip (SoC), etc.).

According to one embodiment, the processor 140 may be implemented as a digital signal processor (DSP), a microprocessor, or a Time Controller (TCON), but is not limited thereto. The processor may include one or more of a central processing unit (CPU), a microcontroller unit (MCU), a micro processing unit (MPU), a controller, an application processor (AP), a communication processor (CP), or an Advanced RISC Machine (ARM) processor. The processor 140 may be implemented as a system on chip (SoC), a large scale integration (LSI) with a processing algorithm embedded therein, or as field programmable gate array (FPGA).

Figure 2:
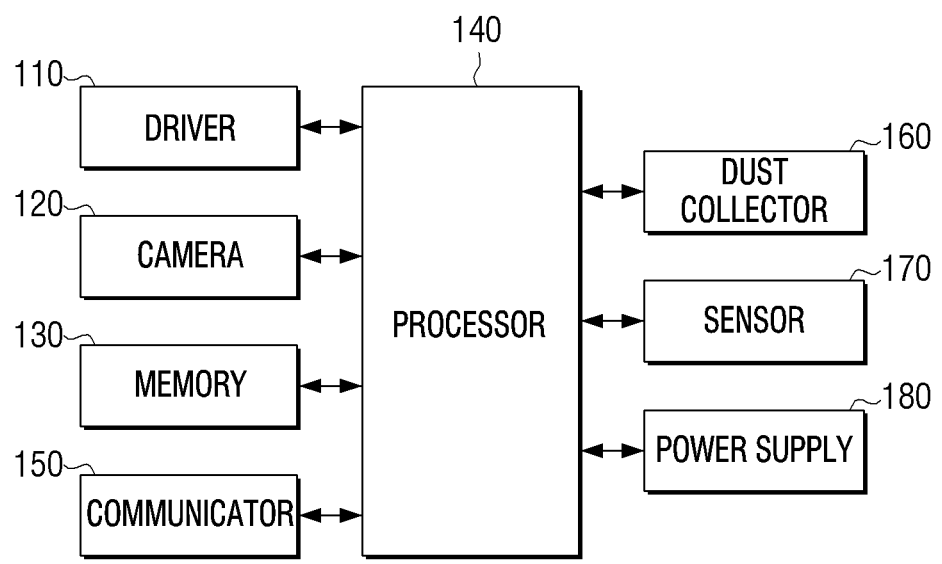
FIG. 2 is a detailed block diagram illustrating a configuration of a cleaning robot according to an embodiment.

FIG. 2 is a detailed block diagram illustrating a configuration of a cleaning robot according to an embodiment. Referring to FIG. 2, the cleaning robot 100 may include the driver 110, the camera 120, the memory 130, a communicator 150, a dust collector 160, a sensor 170, a power supply 180, and the processor 140 for controlling the configuration described above. Since the driver 110, the camera 120, the memory 130, and the processor 140 have already been described, the description thereof will be omitted.

The communicator 150 can transmit and receive data, control commands, and the like with an external device. For example, the communicator 150 may receive global area map information including location information for the space in which the cleaning robot 100 is operating from the external device. Also, the communicator 150 may transmit information to update the entire area map information to an external device. In another example, the communicator 150 may receive a signal to control the cleaning robot 100 transmitted by the user using a remote control device. At this time, the remote control device may be implemented in various forms such as a remote controller, a mobile device, or the like.

The communicator 150 can transmit and receive data or the like with an external server (not shown). For example, when an artificial intelligence model is stored in an external server, the communicator 150 can transmit an image captured by the camera 120 to the external server and receive information on the obstacles recognized by using the artificial intelligence model stored on the external server. This is only one embodiment, and the communicator 150 can receive information about the movable area of the space to which the cleaning robot 100 is to perform a task from the external server.

The communicator 150 may use various wireless communication methods such as near field communication (NFC), wireless LAN (LAN), infrared (IR) communication, Zigbee communication, WiFi, Bluetooth, or the like.

The dust collector 160 is configured to collect dust. Specifically, the dust collector 160 may inhale and collect dust in the inhaled air. For example, the dust collector 160 may include a motor which passes air through a guide pipe leading to an outlet port from an inhale port, a filter for filtering dust in the inhaled air, and a dust container which collects filtered dust, or the like.

The sensor 170 may include various kinds of sensors. Specifically, the sensor 170 can include a dust sensor, an odor sensor, a laser sensor, an ultra-wideband (UWB) sensor, an image sensor, a sensor for detecting the vicinity such as an obstacles sensor, a gyro sensor, a global positioning system (GPS) sensor for detecting a moving state, or the like. The sensor for detecting the vicinity and the sensor for detecting a moving state of the cleaning robot may be implemented in a different configuration and may be implemented in one configuration. Each sensor of the sensor 170 may be implemented in a separate configuration. The sensor 170 may further include various kinds of sensors, and may not include some of the sensors shown in accordance with the task which the cleaning robot 100 is to perform.

The dust sensor and the odor sensor may be used to sense contamination of the environment surrounding the cleaning robot 100. The dust sensor may detect the concentration of dust around the cleaning robot 100. For example, the dust sensor can sense the concentration of dust inhaled from the dust collector 160. The dust sensor may detect the concentration of the dust by using scattered light by the dust particles. Additionally, the odor sensor can sense a specific odor. For example, the odor sensor can sense a contaminant material, such as excreta of a pet. The odor sensor can sense a specific odor through changes in electrical resistance due to contact with the odor molecules.

The laser sensor can sense the complexity of the environment surrounding the cleaning robot 100. For example, the laser sensor can emit a laser beam in the entire directions to sense whether an object exists around the cleaning robot 100. When a furniture, such as a chair, is placed around the cleaning robot 100, the complexity may be highly evaluated, and the complexity may be evaluated to be low when there is no object around the cleaning robot 100.

The UWB sensor can measure the distance using time of flight (TOF) for transmitting and receiving electromagnetic wave. The UWB sensor can measure the distance with a high accuracy using a signal characteristic of an ultra-wide band. By placing a plurality of UWB sensors on the cleaning robot 100, the direction of a position where the UWB tag is located may be identified. For example, when the UWB sensor is used, the position where the UWB tag is located may be tracked, so even if a position of the charging station where the UWB tag is installed is changed, the cleaning robot 100 may return by finding an accurate position of the charging station.

The obstacles sensor can sense obstacles that prevent movement of the cleaning robot 100. For example, the obstacles sensor may include a non-contact sensing sensor and a contact type collision/bumper sensor capable of identifying a wall, a gap, a pillar, a door sill, a low hill, etc. through which the cleaning robot 100 cannot pass.

The gyro sensor is a sensor used in position measurement and direction setting and the like by using kinematics of the rotating cleaning robot 100. The gyro sensor measures angular velocity unlike an acceleration sensor for measuring acceleration. A gyroscope is an apparatus for measuring angular velocity, and a gyro sensor in the form of a chip using micro electro mechanical systems (MEMS) technology can measure angular velocity.

The power supply 180 supplies power required for driving the cleaning robot 100. For example, the power supply 180 may be implemented as a battery capable of charging and discharging. The processor 140 can control the driver 110 to move to the charging station when the remaining power source of the cleaning robot 100 is dropped below a predetermined level, or when the task is completed. The charging method of the power supply 180 can include both contact and non-contact charging.

Figure 3:
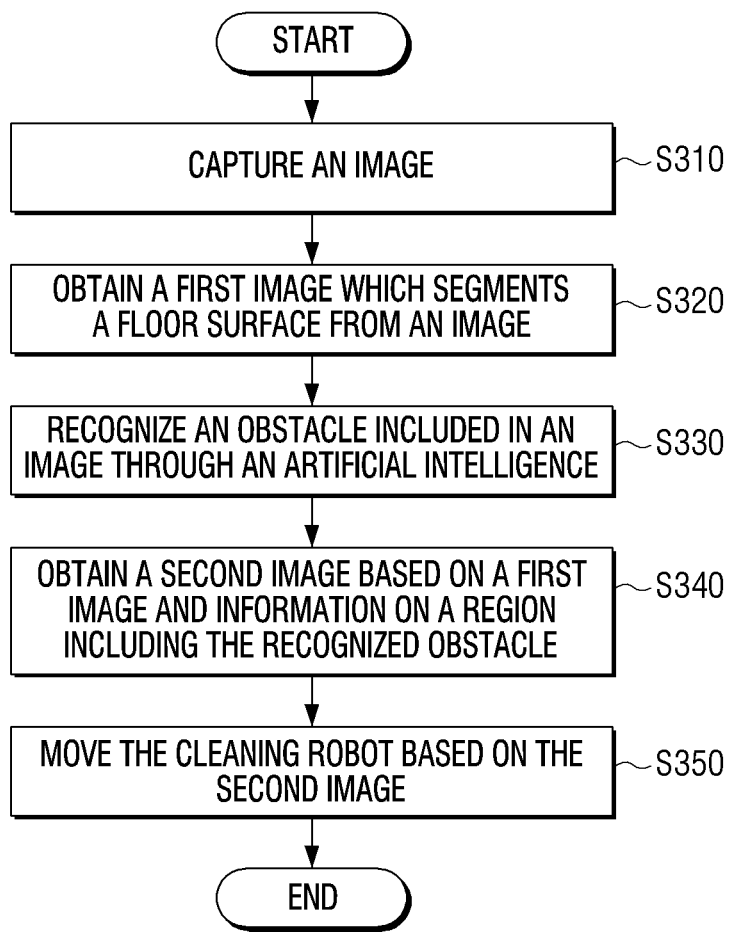
FIG. 3 is a flowchart illustrating a method of analyzing an image captured to determine a moving direction by the cleaning robot according to an embodiment.

FIG. 3 is a flowchart illustrating a method of analyzing an image captured to determine a moving direction by the cleaning robot according to an embodiment.

Referring to FIG. 3, the cleaning robot 100 can capture an image which captures a surrounding environment in operation S310. At this time, the captured image may be an image which captures the environment in the same direction of the moving direction of the cleaning robot 100 or an image which captures the environment with respect to the direction different from the moving direction.

The cleaning robot 100 can obtain a first image (bottom surface split image) that separates the bottom surface in the captured image in operation S320. In addition, the cleaning robot 100 may input the acquired image to the learned artificial intelligence model to recognize the object, and output information on the type of obstacles by recognizing the obstacles included in the image in operation S330. In addition, the cleaning robot 100 can determine the size of an access-forbidden region including obstacles based on information on the type of obstacles. The first artificial intelligence model may be a convolutional neural network (CNN), but is not limited thereto, and may use various neural networks such as generative adversarial network (GAN), deep neural network (DNN), recurrent neural network (RNN), bidirectional recurrent deep neural network (BRDNN), or the like.

The cleaning robot 100 may obtain a second image on the basis of information on an area (access-forbidden area) including the first image and the recognized obstacles in operation S340. The second image may be an image indicating only the area in which the cleaning robot 100 can perform the cleaning task. The cleaning robot 100 may determine a moving speed and a moving direction based on the second image and may move to perform a cleaning task in operation S350.

Figure 4A:
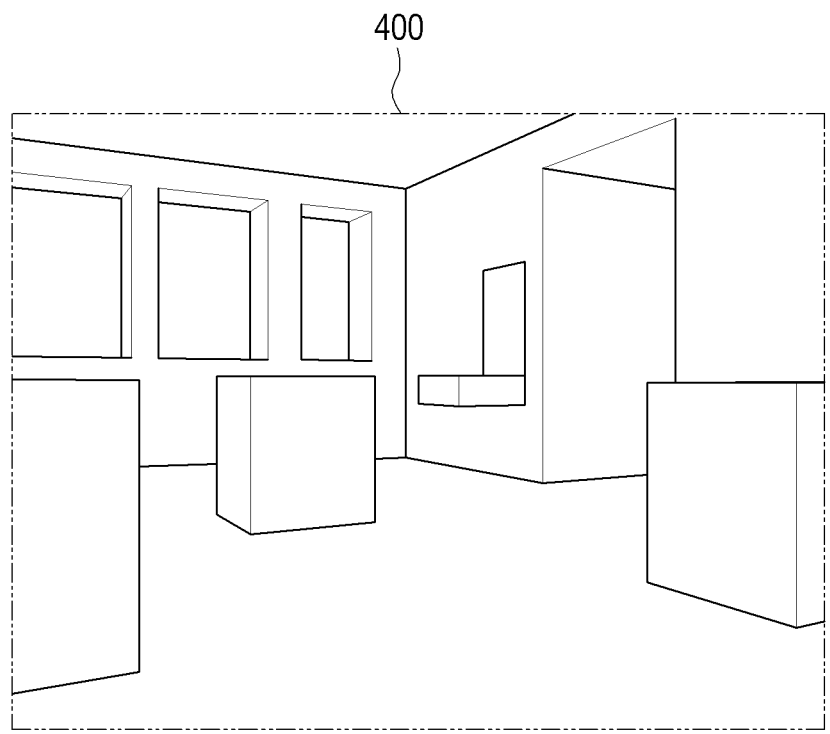
FIGS. 4A and 4B are diagrams illustrating obtaining a floor surface segmentation image from an image which is captured by the cleaning robot according to an embodiment.
Figure 4B:
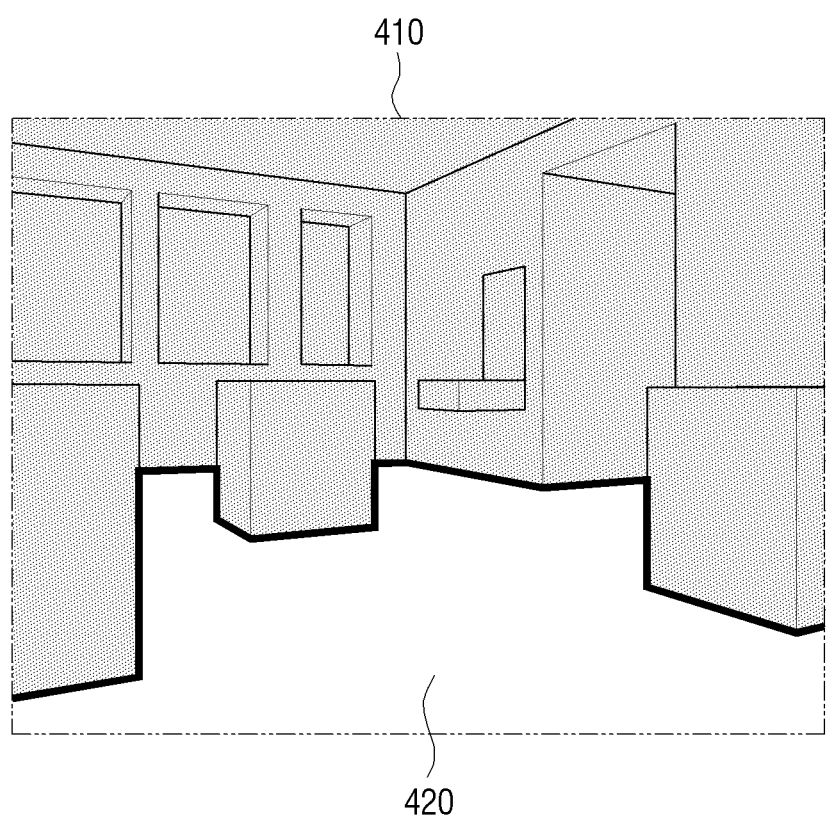

FIGS. 4A and 4B are diagrams illustrating obtaining a floor surface segmentation image from an image which is captured by the cleaning robot according to an embodiment.

FIG. 4A illustrates a front image of the cleaning robot 100 captured by the camera 120. The cleaning robot 100 may perform scene segmentation for the obtained image 400 to obtain a floor segmentation image 410 illustrated as FIG. 4B.

The scene segmentation refers to a technology of classifying pixels which are a component of an image and identifying a desired object by searching a boundary line of an object in the image. For example, if the shape and size of an object are to be known in the image, the image should be segmented to two regions of an image and a background. An object plays an important role in interpretation and representation of images. In particular, a moving picture experts group (MPEG)-4 visual standard encodes an image by an object unit. This technique is called object-based coding. According to necessity, an image may be reproduced or efficiently compressed using various editing techniques for objects such as combining, removing, and deforming an object.

However, since there is no explicit boundary in each acquired image and the characteristic of each image is different, the cleaning robot 100 can distinguish a homogeneous region having a similar value based on characteristics of an image such as luminance, edge information, or geometric information in the obtained image 400. The cleaning robot 100 may overlap regions having similar characteristics among the segmented regions to obtain a floor surface area 420, and may mask other regions.

The cleaning robot 100 may obtain floor segmentation image as FIG. 4B using a scene segmentation algorithm such as thresholding, region growing, split-and-merging, watershed, and a method based on edge as a scene segmentation algorithm.

The cleaning robot 100 may segment the acquired image in a frame unit, and estimate a floor surface to be segmented to determine the position of the windows corresponding to the floor surface. The cleaning robot 100 may adjust at least one of the size and the interval of the windows present in the determined position of the windows, and may separate only a floor surface 420 as shown in FIG. 4B from the input image by using the windows in which at least one of the size and the interval is adjusted.

According to one embodiment, the cleaning robot 100 may obtain a floor segmentation image using a second artificial intelligence (AI) model trained to recognize the floor surface. At this time, the second AI model may be stored in the cleaning robot 100 or stored in an external server. When the second AI model is stored on the external server, the cleaning robot 100 can transmit information about the captured image to the external server through the communicator 150, and receive a floor segmentation image which is output from the second AI from the external server. The second AI model may be a CNN, but this is merely exemplary, and may use various neural networks such as GAN, DNN, RNN, and BRDNN.

The cleaning robot 100 may use the scene segmentation technique and may separate the floor surface 420 as illustrated in FIG. 4B from the image input using the second AI.

Figure 5A:
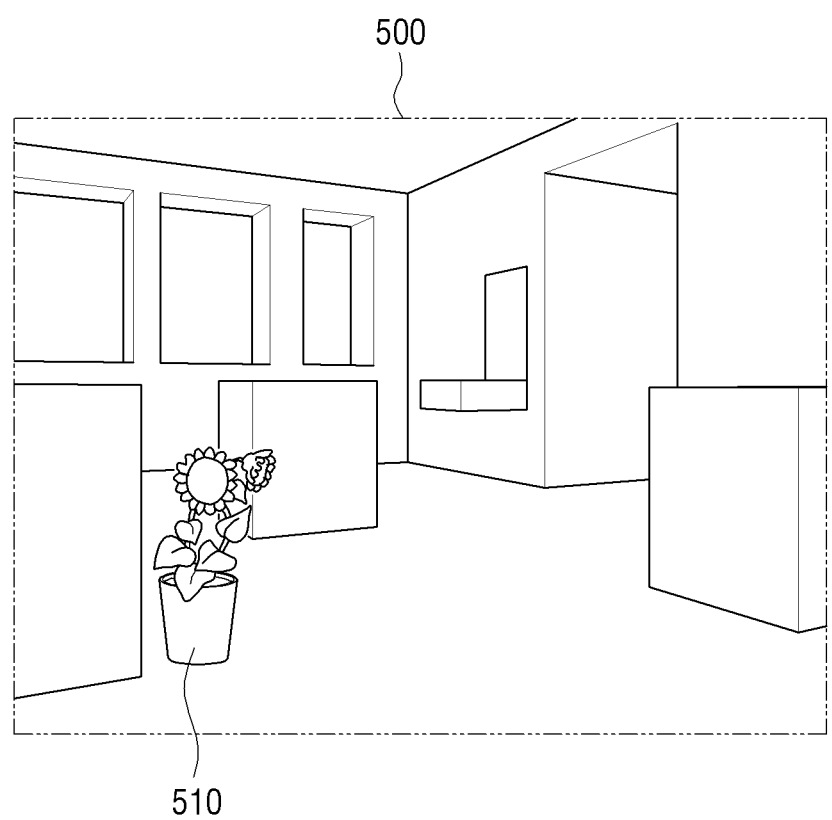
FIGS. 5A to 5C are diagrams illustrating obtaining information about obstacles from an image captured by the cleaning robot according to an embodiment.
Figure 5B:
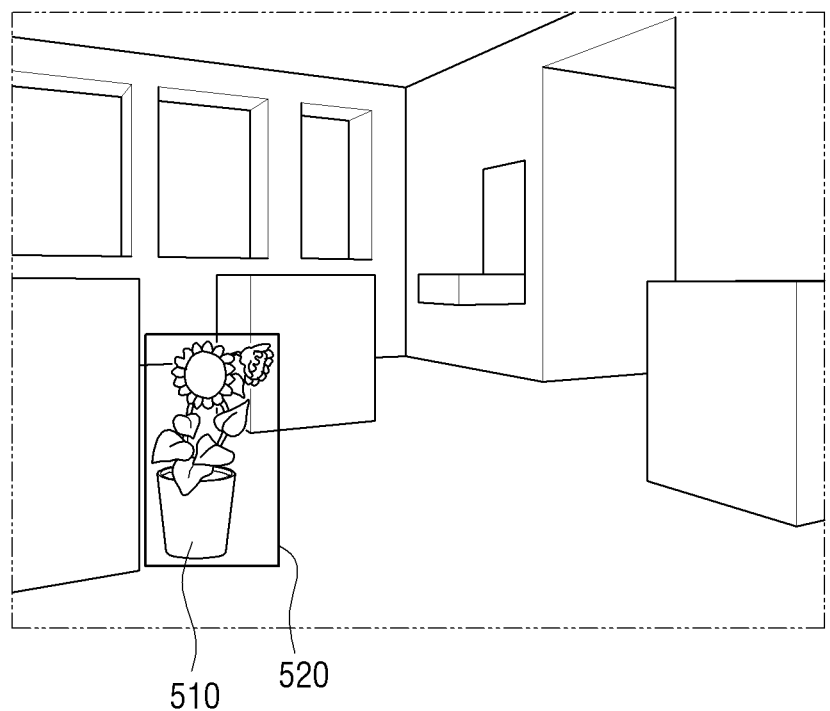
Figure 5C:
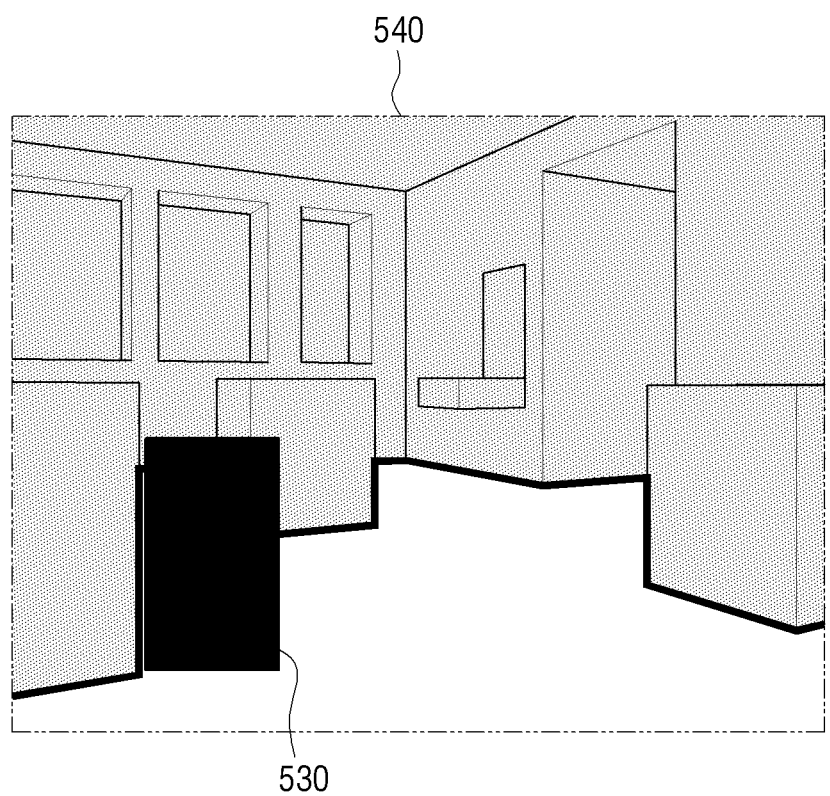

FIGS. 5A to 5C are diagrams illustrating obtaining information about obstacles from an image captured by the cleaning robot according to an embodiment.

FIG. 5A is a view capturing an image 500 in the same direction as the movement direction of the cleaning robot 100 through the camera 120. Referring to FIG. 5A, the captured image includes obstacles 510, not structures such as a wall. The cleaning robot 100 may receive the obtained image 500 to the first AI model to recognize the obstacles, and output information about the type of obstacles. The cleaning robot 100 may identify an access-forbidden region including obstacles based on the information about the recognized obstacles.

Referring to FIG. 5B, if obstacles such as a vase 510 is included in the input image 500, the first AI model may output information that obstacles are included in the input image and information that the type of the included obstacles is a vase. The cleaning robot 100 may identify the scope of the access-forbidden region 520 when the cleaning task is performed according to the type of recognized obstacles.

The cleaning robot 100 may output the range of the region 520 not to be accessed according to the type of obstacles. When the recognized obstacles are a vase as described above, the cleaning robot 100 may identify a region corresponding to twice the width of the vase as an access-forbidden region. If the recognized obstacles are a doll, the cleaning robot 100 may identify a region corresponding to 1.5 times of the width of the doll as a region not to be accessed. In case of a doll, even if the cleaning robot 100 accesses for cleaning, risk of damage is relatively small. Data for setting an access-forbidden region for each type of obstacles may be stored in the memory 130 and received from an external server through the communicator 150.

Referring to FIG. 5C, the cleaning robot 100 may overlap the access-forbidden region including the recognized obstacles with a floor segmentation image obtained through scene segmentation and store the same. The cleaning robot 100 may mask an access-forbidden region 520 including obstacles. As a result, the cleaning robot 100 can obtain an image 540 in which the masked region 530 is overlapped with the segmented scene of the floor surface. The cleaning robot 100 may set a moving path for performing a task on the basis of the overlapping image 540. This will be described in greater detail later.

Figure 6A:
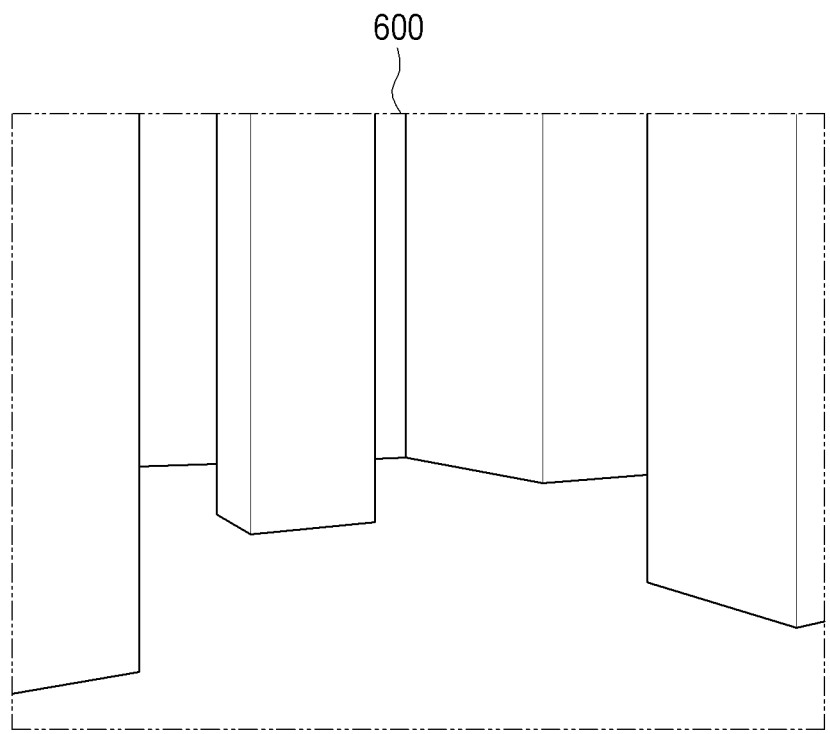
FIGS. 6A and 6B are diagrams illustrating obtaining a depth map image from an image obtained by the cleaning robot according to an embodiment.
Figure 6B:
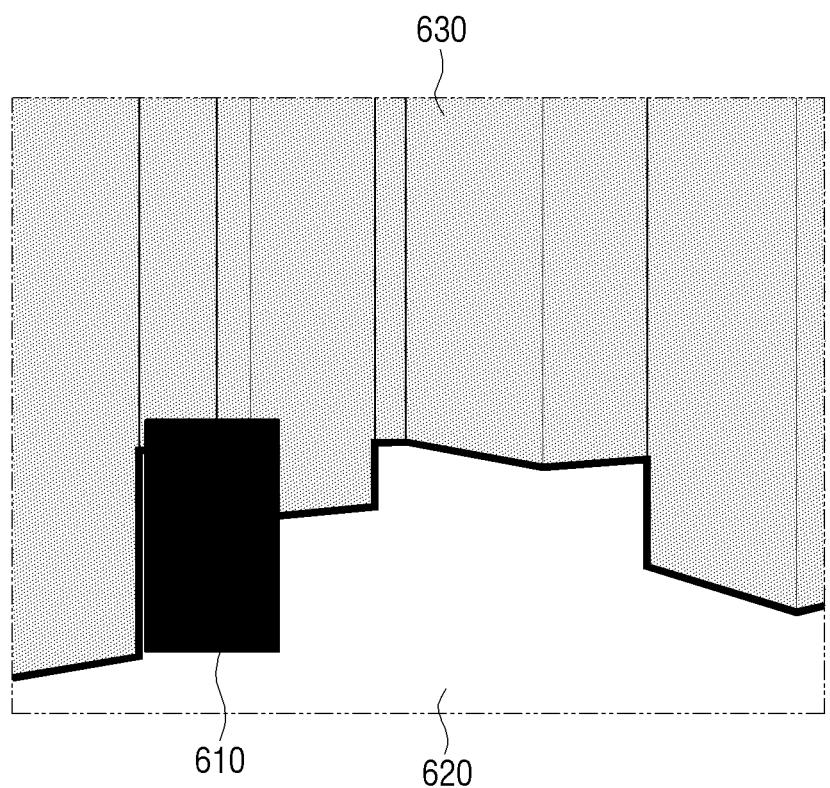

FIGS. 6A and 6B are diagrams illustrating obtaining a depth map image from an image obtained by the cleaning robot according to an embodiment.

As illustrated in FIGS. 4-5, the cleaning robot 100 may obtain a floor segmentation image from the image obtained to set a moving path, but may obtain a depth map for an image as shown in FIG. 6A. The cleaning robot 100 may estimate the distance to the wall surface through a depth map image for the obtained image.

According to an embodiment, the cleaning robot 100 may overlap an access-forbidden region 610 including the recognized obstacles with a depth map. According to another embodiment, the cleaning robot 100 may overlap and store the obtained depth map with a portion 620 in which the floor surface is segmented and the access-forbidden region 610.

Through the above embodiment, the cleaning robot 100 may obtain more accurate structures information and plan a path of the cleaning robot 100 more safely based on the information which even includes the depth information of the surrounding environment.

Figure 7A:
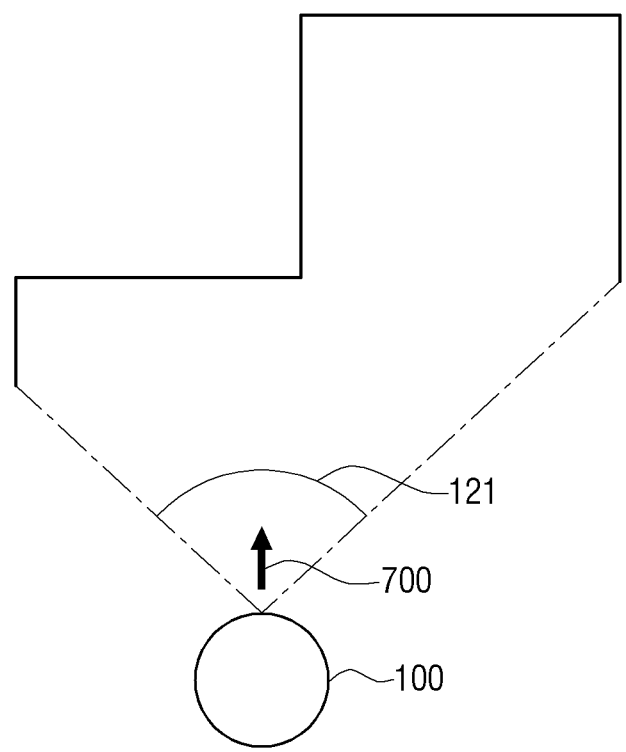
FIGS. 7A and 7B are diagrams illustrating a method for estimating a distance to a wall through an image obtained by the cleaning robot according to an embodiment.
Figure 7B:
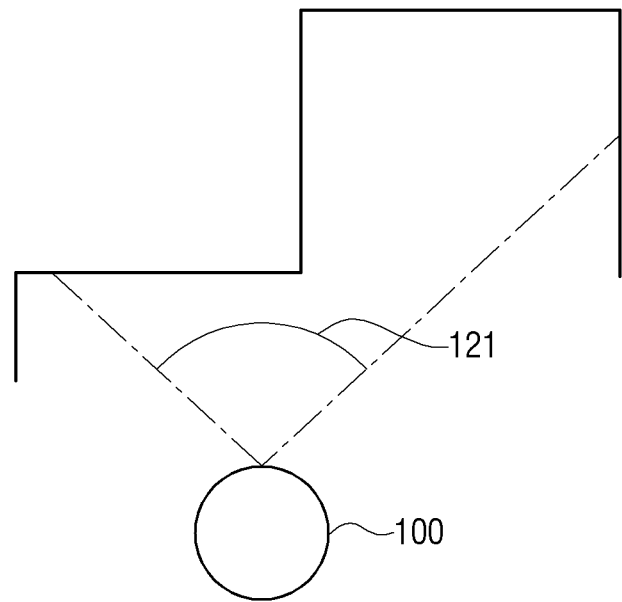

FIGS. 7A and 7B are diagrams illustrating a method for estimating a distance to a wall through an image obtained by the cleaning robot according to an embodiment.

Referring to FIG. 7A, the cleaning robot 100 can obtain an image around the cleaning robot 100 as in FIGS. 4 and 5. Referring to FIG. 7A, after the cleaning robot 100 is located in a task-performing place which is not prestored in the memory 130, and obtains an image for performing the task. The cleaning robot 100 may obtain a first image corresponding to a range which corresponds to an angle of view 121 of the camera 120. At this time, the obtained image may be an image corresponding to the front of the cleaning robot 100 based on a driving direction 700 of the cleaning robot 100.

After obtaining an image, the cleaning robot 100 can move in a driving direction 700 to perform the task. The cleaning robot 100 may obtain a first image in a stopped state and obtain a first image during movement. The cleaning robot 100 can obtain information on the moving state of the cleaning robot 100 which moves from the first position to the second position through the sensor 170. Specifically, the information about the moving state may include information about the movement direction and the movement speed of the cleaning robot 100. When the cleaning robot 100 obtains the first image in the first position, the cleaning robot 100 can store information on the moving state of the cleaning robot 100 when obtaining the first image in the memory 130 as well.

While moving in the driving direction 700, the cleaning robot 100 can obtain information about the moving state of the cleaning robot 100. The cleaning robot 100 may obtain a second image at a second position as shown in FIG. 7B at a predetermined time interval after acquiring the first image. Similarly, the cleaning robot 100 can obtain information about the moving state of the cleaning robot 100 when obtaining the second image and may store the information in the memory 130 together with the second image.

The cleaning robot 100 can estimate the distance between the cleaning robot and the wall surface based on information about the movement state of the cleaning robot 100, the first image, and the second image. For example, the cleaning robot 100 may obtain a floor segmentation image for the first image and the second image (first floor segmentation image and second floor segmentation image). The cleaning robot 100 may calculate a moving distance based on information about the moving speed until the second image is obtained after obtaining the first image. The cleaning robot 100 may calculate a distance to the wall based on the difference between the first floor segmented image (not shown) and the second floor segmented (not shown) and the moving distance pf the cleaning robot 100.

The cleaning robot 100 may calculate the distance to the wall included in the obtained image and may set the moving direction and moving speed of the cleaning robot 100. This will be described with reference to FIGS. 8A and 8B.

Figure 8A:
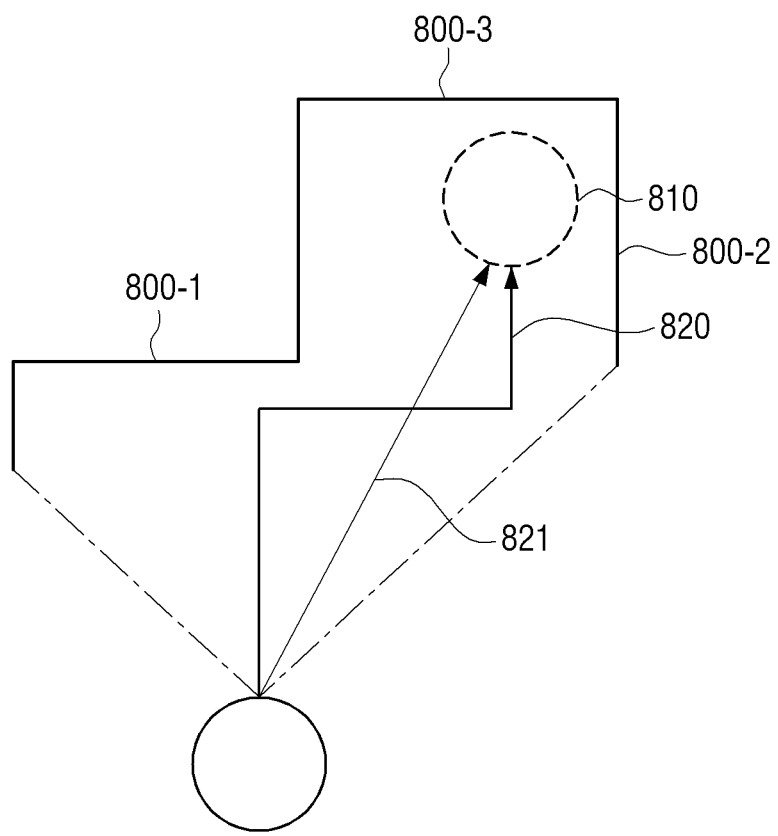
FIGS. 8A and 8B are diagrams illustrating efficient moving of the cleaning robot to perform a task according to an embodiment.
Figure 8B:
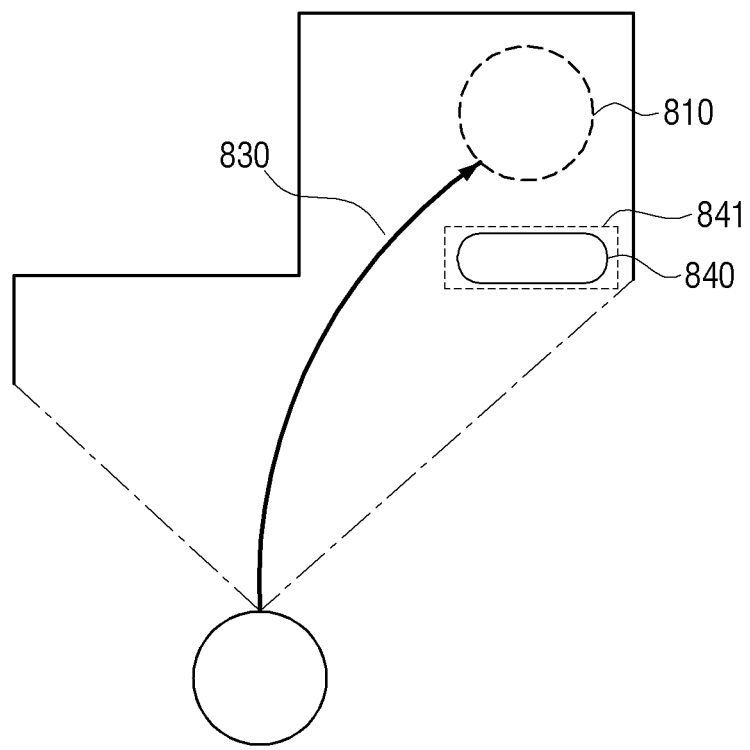

FIGS. 8A and 8B are diagrams illustrating efficient moving of the cleaning robot to perform a task according to an embodiment.

In order for a related-art cleaning robot using a proximity sensor to move to a wider space 810, the cleaning robot 100 may move through a first path 820 in which the cleaning robot 100 approaches a first wall 800-1 and change a moving direction, and then approaches a second wall 800-2 and change a moving direction again.

As illustrated in FIGS. 7A and 7B, the cleaning robot 100 may calculate a distance to the wall surface and may set a moving speed and a moving direction of the cleaning robot. The cleaning robot 100 may identify a movement direction corresponding to a second path 821 which reaches a large space 820 in the image at a time based on the distance between the first wall 800-1 and the second wall 800-2.

Specifically, the cleaning robot 100 may identify a moving direction using 1) the distance between the cleaning robot 100 and the first wall 800-1 and 2) an angle between the cleaning robot 100 and the first wall 800-1 and the second wall 800-2. More specifically, the cleaning robot 100 may identify a path in which the distance between the cleaning robot 100 and the first wall 800-1 and the distance between the cleaning robot 100 and the second wall 800-2 become identical, and may identify a direction toward the path as the moving direction of the cleaning robot 100.

The cleaning robot 100 may determine a moving speed of the cleaning robot 100 which moves the identified direction to reach the wider space 820 in the image.

The cleaning robot 100 may obtain information about the distance to a third wall 800-3 included in the image. The cleaning robot 100 may obtain an image of the front by a predetermined time interval during the movement, and calculate the distance to each wall surface based on the moving state information of the cleaning robot 100 whenever an image is obtained. The cleaning robot 100 may move at a first speed until the distance between the cleaning robot 100 and at least one of the first, second, and third wall surfaces reaches within a predetermined first distance. When the distance between the cleaning robot 100 and at least one of the first, second, and third wall surfaces becomes smaller than the predetermined first distance, the cleaning robot 100 may move at a second speed less than the first speed. The cleaning robot 100 may stop the movement when at least one distance among distances to the first, second, and third wall surfaces is smaller than the predetermined second distance.

In an embodiment, first and second predetermined distances are described to change speed of the cleaning robot 100, but this is merely exemplary, and two or more predetermined distances may be set to provide consecutive speed controls.

When an obstacle 840 is included in the image acquired by the cleaning robot 100 as illustrated in FIG. 8B, the cleaning robot 100 may recognize the obstacle 840 through the first AI model and may determine a region 841 in which the cleaning robot does not access according to the type of the obstacle 840. The cleaning robot 100 may recognize the region 841 not to be accessed as structures such as a wall or the like. As shown in FIG. 8A, the cleaning robot 100 can determine a movement direction corresponding to a path 830 for efficiently moving up to a large space 810 based on at least one of the distances to the first, second, and third wall surfaces, and the distance to the region 841.

The cleaning robot 100 may identify a moving direction by using 1) a distance between the cleaning robot 100 and the first wall 800-1 and the access-forbidden region 841, 2) a distance between the cleaning robot 100 and the second wall 800-2 and the third wall 800-3, and 3) an angle between the cleaning robot 100, the first wall 800-1 and the access-forbidden region 841, or the like. More specifically, the cleaning robot 100 may identify a path in which the distance between the cleaning robot 100 and the first wall 800-1 and the distance between the cleaning robot 100 and the access-forbidden region 841 become identical, and identify the direction toward the corresponding path as the moving direction of the cleaning robot 100. When the cleaning robot 100 detects that the angle between the access-forbidden region 841 and the movement direction of the cleaning robot 100 is greater than 90 degrees, the cleaning robot 100 may identify a patch in which the distance between the cleaning robot 100 and the second wall 800-2 and the third wall 800-3 are the same, and may identify the direction toward the corresponding path as the moving direction of the cleaning robot 100.

The cleaning robot 100 can set the moving speed based on at least one of the distance to the first, second, and third wall surfaces, and the distance to the region 841. The cleaning robot 100 may move at a first speed until at least one distance between the cleaning robot 100 and the first, second, and third wall surfaces and the distance to the region 841 reaches a predetermined first distance, while moving through the path 830. When at least one of the distance between the cleaning robot 100 and the distance to the first, second, and third wall surfaces and the distance to the region 841 is smaller than the predetermined first distance, the cleaning robot 100 may move at a second speed less than the first speed. The cleaning robot 100 may stop the movement when at least one of the distance to the first, second, and third wall surfaces and the distance to the region 841 is smaller than the second distance.

According to the above-described embodiment, the cleaning robot 100 may provide a cleaning service through the most efficient moving direction and speed to a large space in consideration of the position of the structures and the obstacles unlike the related-art cleaning robot. The cleaning robot 100 may perform cleaning of a sub-space after moving to a large space and may provide an effective cleaning service as if a person cleans the space.

Figure 9A:
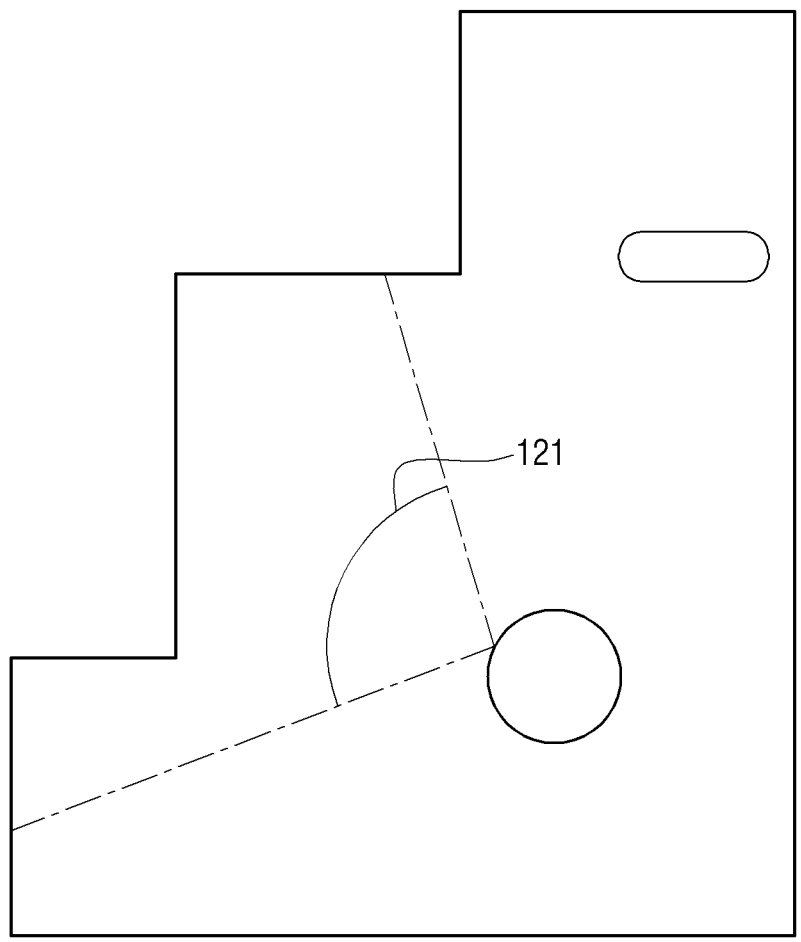
FIGS. 9A and 9B are diagrams illustrating generating a navigation map for a space where the cleaning robot is to perform a task according to an embodiment.
Figure 9B:
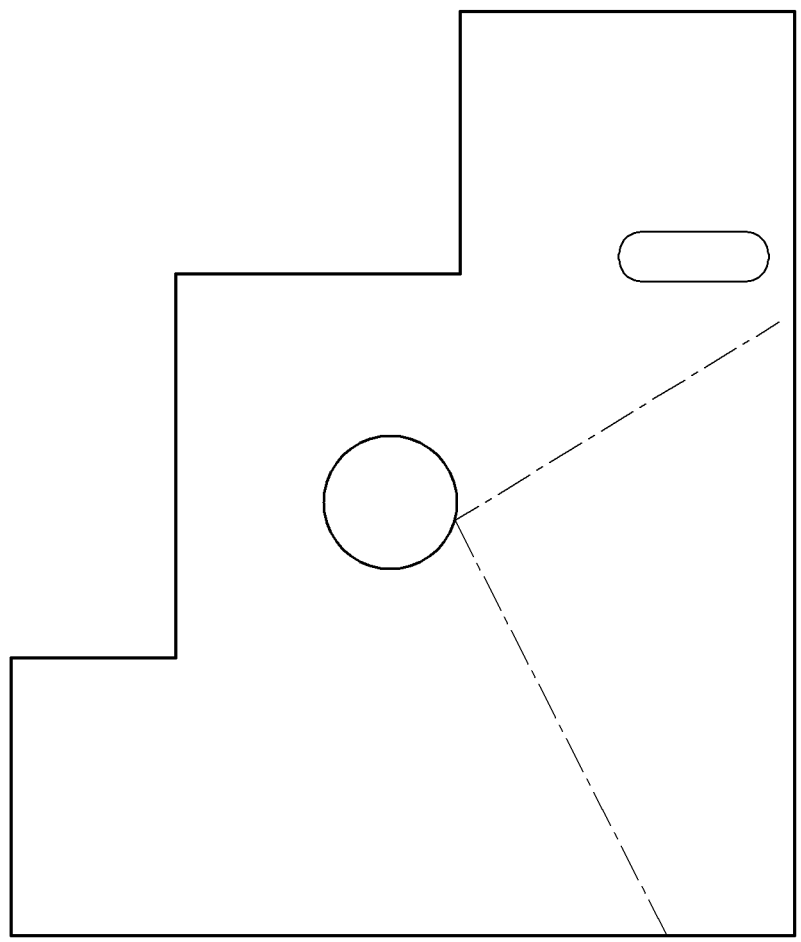

FIGS. 9A and 9B are diagrams illustrating generating a navigation map for a space where the cleaning robot is to perform a task.

Referring to FIG. 9A, the cleaning robot 100 may capture an image corresponding to an angle of view 121 of the camera 120. The cleaning robot 100 may obtain information about moving state information and a capturing direction at the time when capturing an image. The cleaning robot 100 may obtain each floor segmentation image based on a plurality of images acquired while moving to perform a cleaning task, and store information about the capturing direction and moving state information in a memory along with the floor segmentation information. This is merely exemplary, and the cleaning robot 100 may overlap a region including the obstacles recognized by the AI model with the segmented image of a floor space, and may store the overwrapped image together with information about the capturing direction of each image and movement state information. The region including obstacles is a region which the cleaning robot 100 may recognize as structures and may not access, and the size of the region may vary depending on the type of obstacles recognized by the AI model.

The cleaning robot 100 may generate a navigation map for performing a cleaning task based on information about a floor segmentation image of a captured image, a region including obstacles, information about the capturing direction of each image, and information on a moving state of the cleaning robot 100 during capturing, or the like.

For example, the cleaning robot 100 may obtain a first floor segmentation image at a first position and obtain a second floor segmentation image at a second position while maintaining a capturing direction. The first and second floor segmentation images may include a first wall surface. The distance from the first and second positions to the first wall surface may be calculated based on information about the moving state of the cleaning robot 100 which moves from the first position of the cleaning robot 100. The cleaning robot 100 may obtain a third floor segmentation image after capturing the image by differentiating a capturing direction at the second position, and may obtain a fourth floor segmentation image at the third position while maintaining the capturing direction. The third and fourth floor segmentation images may include a first wall and a second wall surface. The cleaning robot 100 may calculate the distance from the second and third positions to the second wall surface based on information about the moving state of the cleaning robot 100 which moves from the second position to the third position. The cleaning robot 100 may identify a shape formed by the first wall and the second wall based on the distance from the first position to the first wall surface, the distance from the second position to the first and second wall surfaces, and the distance from the third position to the second wall.

By the above method, the cleaning robot 100 may identify the shape of the structures and obstacles such as a wall in a space to be cleaned, and may generate an entire navigation map to perform a cleaning task as illustrated in FIG. 9B.

The cleaning robot 100 may identify the position of the cleaning robot 100 through the navigation map when the position of the cleaning robot 100 is newly changed, for example, the cleaning robot 100 is put away by a user, or the like. The cleaning robot 100 may capture a surrounding image at a newly changed position, and may obtain information about the floor segmentation image and the capturing direction of the captured image. The cleaning robot 100 may compare a plurality of floor segmentation images and capturing direction information used in generating a navigation map and the floor segmentation image obtained at a new position and the capturing direction information, and may identify a position on the navigation map of the cleaning robot 100 as a result of comparison.

Figure 10:
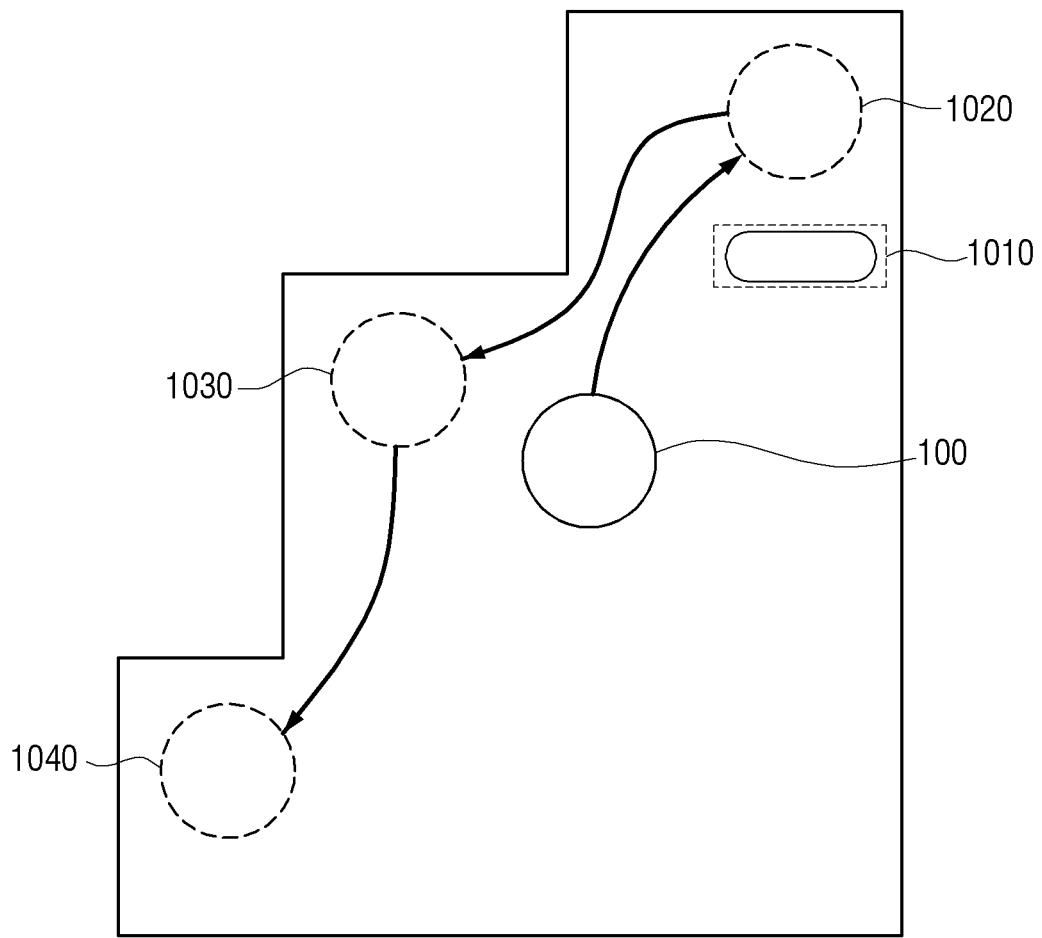
FIG. 10 is a diagram illustrating establishing a moving plan to perform a cleaning task by the cleaning robot using a navigation map.

FIG. 10 is a diagram illustrating establishing a moving plan to perform a cleaning task by the cleaning robot using a navigation map.

If the position of the cleaning robot 100 on the navigation map is identified, the cleaning robot 100 may establish a moving plan for performing the cleaning task. Referring to FIG. 10, the cleaning robot 100 may move to a large space 1020, 1030, 1040 of the structures and may efficiently perform a task. The cleaning robot 100 may establish a moving plan based on information on a region 1010 not to be accessed including the obstacles included in generating the navigation map.

The cleaning robot 100 may capture a surrounding image through the camera 120 even while moving according to the established moving plan. The cleaning robot 100 may recognize the obstacles included in an image through the AI model, and identify a region not to be accessed by identifying the type of obstacles in real time. The cleaning robot 100 may change the moving plan in real time based on the identified region including obstacles. The cleaning robot 100 may update information on the region that is not to be accessed including the identified obstacles to the navigation map.

Figure 11A:
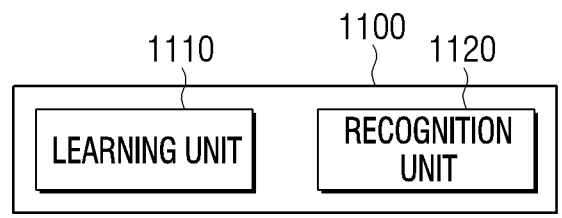
FIGS. 11A and 11B are block diagrams illustrating a learning unit and a recognition unit according to various embodiments.
Figure 11B:
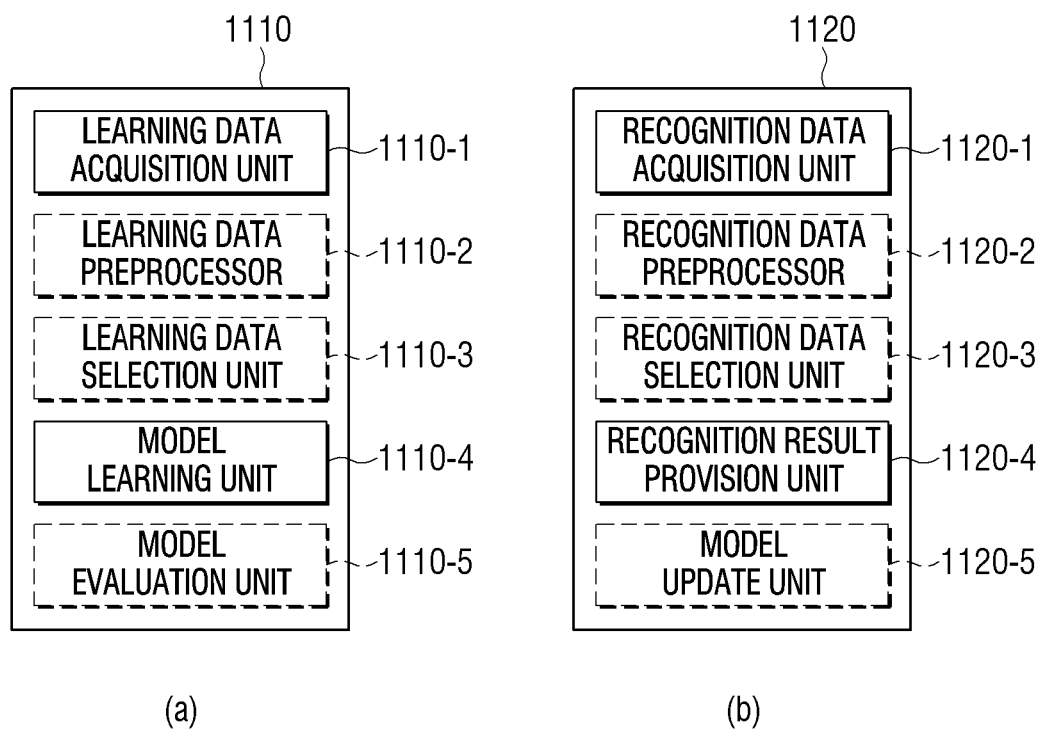

FIGS. 11A and 11B are block diagrams illustrating a learning unit and a recognition unit according to various embodiments.

Referring to FIG. 11A, the processor 1100 may implement at least one of a learning unit 1110 and a recognition unit 1120. The processor 1100 of FIG. 11A may correspond to the processor 140 of the robot cleaner 100 as illustrated in FIG. 2 or a processor of a data learning server (not shown).

The learning unit 1110 may generate or train a recognition model to identify a predetermined situation. The learning unit 1110 may generate a recognition model having an identification criterion using the collected learning data.

For example, the learning unit 1110 may generate, train, or update an object recognition model having a criterion of identifying what is an object included in an image using an image including an object as learning data.

In another example, the learning unit 1110 may generate, train, or update a peripheral information recognition model having a criterion for identifying various additional information around the object included in the image using peripheral information included in a screen including an object as learning data.

As another example, the learning unit 1110 may generate, train, or update the obstacles recognition model having a criterion to identify obstacles included in an image using an image captured by a camera as learning data.

The recognition unit 1120 may estimate a recognition subject included in predetermined data using predetermined data as input data of a trained recognition model.

In an example, the recognition unit 1120 may obtain (or estimate, predict) object information about an object included in an object region using an object region (or image) including an object as input data as a trained recognition model.

In another example, the recognition unit 1120 may estimate (or determine, infer) a search category for providing a search result by applying object information to the trained recognition model. The search result may be plural according to priorities.

At least a portion of the learning unit 1110 and at least a portion of the recognition unit 1120 may be implemented as software modules or at least one hardware chip form and mounted in an electronic device. For example, at least one of the learning unit 1110 and the recognition unit 1120 may be manufactured in the form of an exclusive-use hardware chip for artificial intelligence (AI), or a conventional general purpose processor (e.g., a CPU or an application processor) or a graphics-only processor (e.g., a GPU) and may be mounted on the cleaning robot 100 as described above. Herein, the exclusive-use hardware chip for artificial intelligence is a dedicated processor for probability calculation, and it has higher parallel processing performance than existing general purpose processor, so it can quickly process computation tasks in artificial intelligence such as machine learning. When the learning unit 1110 and the recognition unit 1120 are implemented as a software module (or a program module including an instruction), the software module may be stored in a computer-readable non-transitory computer readable media. In this case, the software module may be provided by an operating system (OS) or by a predetermined application. Alternatively, some of the software modules may be provided by an O/S, and some of the software modules may be provided by a predetermined application.

In this case, the learning unit 1110 and the recognition unit 1120 may be mounted on one electronic device, or may be mounted on separate electronic devices, respectively. For example, one of the learning unit 1110 and the recognition unit 1120 may be implemented in the cleaning robot 100, and the other one may be implemented in an external server. In addition, the learning unit 1110 and the recognition unit 1120 may provide the model information constructed by the learning unit 1110 to the recognition unit 1120 via wired or wireless communication, and provide data which is input to the recognition unit 1120 to the learning unit 1110 as additional data.

FIG. 11B is a block diagram illustrating the learning unit 1110 and the recognition unit 1120 according to various embodiments.

Referring to FIG. 11B (a), the learning unit 1110 according to some embodiments may implement a learning data acquisition unit 1110-1 and a model learning unit 1110-4. The learning unit 1110 may further selectively implement at least one of a learning data preprocessor 1110-2, a learning data selection unit 1110-3, and a model evaluation unit 1110-5.

The learning data acquisition unit 1110-1 may obtain learning data necessary for the recognition model for inferring a recognition object. The learning data acquisition unit 1110-1 can obtain entire images including an object, an image corresponding to an object area and object information as learning data. The learning data may be data collected or tested by the learning unit 1110 or the manufacturer of the learning unit 1110.

The model learning unit 1110-4 can use the learning data so that the artificial intelligence model has a criterion for identifying a predetermined recognition object. For example, the model learning unit 1110-4 can learn an artificial intelligence model through supervised learning of at least a part of the learning data. Alternatively, the model learning unit 1110-4 may learn, for example, by itself using learning data without specific guidance to make the artificial intelligence model learn through unsupervised learning which detects a criterion for identifying a situation. Also, the model learning unit 1110-4 can train the recognition model through reinforcement learning using, for example, feedback on whether the result of identifying a situation according to learning is correct. The model learning unit 1110-4 can also make an artificial intelligence model learn using, for example, a learning algorithm including an error back-propagation method or a gradient descent.

In addition, the model learning unit 1110-4 may learn a selection criterion about which learning data should be used for estimating a recognition object using input data.

The model learning unit 1110-4 can determine a recognition intelligence model having a great relevance between the input learning data and the basic learning data as a recognition model to be learned when there are a plurality of recognition models previously constructed. In this case, the basic learning data may be pre-classified according to the type of data, and the recognition model may be pre-constructed for each type of data. For example, basic learning data may be pre-classified based on various criteria such as a region in which learning data is generated, time when learning data is generated, size of learning data, a genre of learning data, a generator of learning data, a type of an object in learning data, or the like.

When the recognition model is learned, the model learning unit 1110-4 can store the learned recognition model. In this case, the model learning unit 1110-4 can store the learned recognition model in the memory 130 of the cleaning robot 100. Alternatively, the model learning unit 1110-4 may store the learned recognition model in a memory of a server connected to the cleaning robot 100 via a wired or wireless network.

The learning unit 1110 may further implement a learning data preprocessor 1110-2 and a learning data selection unit 1110-3 to improve the analysis result of the recognition model or to save resources or time required for generation of the recognition model.

The learning data preprocessor 1110-2 can preprocess acquired data so that the data obtained in the learning for identifying a situation may be used. That is, the learning data preprocessor 1110-2 can process the acquired data into a predetermined format so that the model learning unit 1110-4 may use the acquired data for learning to identify a situation.

The learning data selection unit 1110-3 can select data required for learning from the data acquired by the learning data acquisition unit 1110-1 or the data preprocessed by the learning data preprocessor 1110-2. The selected learning data may be provided to the model learning unit 1110-4. The learning data selection unit 1110-3 can select learning data necessary for learning from the acquired or preprocessed data in accordance with a predetermined selection criterion. The learning data selection unit 1110-3 may also select learning data according to a predetermined selection criterion by learning by the model learning unit 1110-4.

The learning unit 1110 may further implement the model evaluation unit 1110-5 to improve an analysis result of the recognition model.

The model evaluation unit 1110-5 may input evaluation data to the recognition model, and if the analysis result which is output from the evaluation result does not satisfy a predetermined criterion, the model evaluation unit 1110-5 may make the model learning unit 1110-4 learn again. In this case, the evaluation data may be predefined data to evaluate the recognition model.

For example, when the number or ratio of evaluation data for which analysis result is not correct exceeds a preset threshold, among the analysis results of the recognition model trained for the evaluation data, the model evaluation unit 1110-5 may evaluate that the data does not satisfy a predetermined criterion.

When there are a plurality of learned recognition models, the model evaluation unit 1110-5 may evaluate whether each learned recognition model satisfies a predetermined criterion, and determine the model which satisfies a predetermined criterion as a final recognition model. Here, when there are a plurality of models that satisfy a predetermined criterion, the model evaluation unit 1110-5 may determine one or a predetermined number of models which are set in an order of higher evaluation score as a final recognition model.

Referring to FIG. 11B(b), the recognition unit 1120 according to some embodiments may implement a recognition data acquisition unit 1120-1 and a recognition result provision unit 1120-4.

In addition, the recognition unit 1120 may further implement at least one of a recognition data preprocessor 1120-2, a recognition data selection unit 1120-3, and a model update unit 1120-5 in a selective manner.

The recognition data acquisition unit 1120-1 may obtain data necessary for identifying a situation. The recognition result provision unit 1120-4 may apply the acquired data obtained from the recognition data acquisition unit 1120-1 to the learned recognition model as an input value to identify a situation. The recognition result provision unit 1120-4 applies the data selected by the recognition data preprocessor 1120-2 or the recognition data selection unit 1120-3 to be described later to the recognition model to obtain the analysis result. The analysis result may be determined by the recognition model.

In an embodiment, the recognition result provision unit 1120-4 may obtain (or estimate) object information corresponding to an object region by applying an object region including the obtained object to the learned recognition model.

In another embodiment, the recognition result provision unit 1120-4 may obtain (or estimate) a search category to provide a search result by applying at least one of an object region, object information, and context information obtained by the recognition data acquisition unit 1120-1 to a learned recognition model.

The recognition unit 1120 may further implement the recognition data preprocessor 1120-2 and the recognition data selection unit 1120-3 in order to improve a recognition result of the recognition model or save resources or time to provide the recognition result.

The recognition data preprocessor 1120-2 may preprocess the acquired data so that the acquired data may be used to identify a situation. That is, the recognition data preprocessor 1120-2 can process the obtained data into the pre-defined format by the recognition result provision unit 1120-4.

The recognition data selection unit 1120-3 can select data required for identifying a situation from the data acquired by the recognition data acquisition unit 1120-1 or the data preprocessed by the recognition data preprocessor 1120-2. The selected data may be provided to the recognition result provision unit 1120-4. The recognition data selection unit 1120-3 can select some or all of the obtained or preprocessed data according to a predetermined selection criterion for identifying a situation. The recognition data selection unit 1120-3 can also select data according to a predetermined selection criterion by learning by the model learning unit 1110-4.

The model update unit 1120-5 can control the updating of the recognition model based on the evaluation of the recognition result provided by the recognition result provision unit 1120-4. For example, the model update unit 1120-5 may provide the analysis result provided by the recognition result provision unit 1120-4 to the model learning unit 1110-4 so that the model learning unit 1110-4 can ask for further learning or updating the recognition model.

Figure 12:
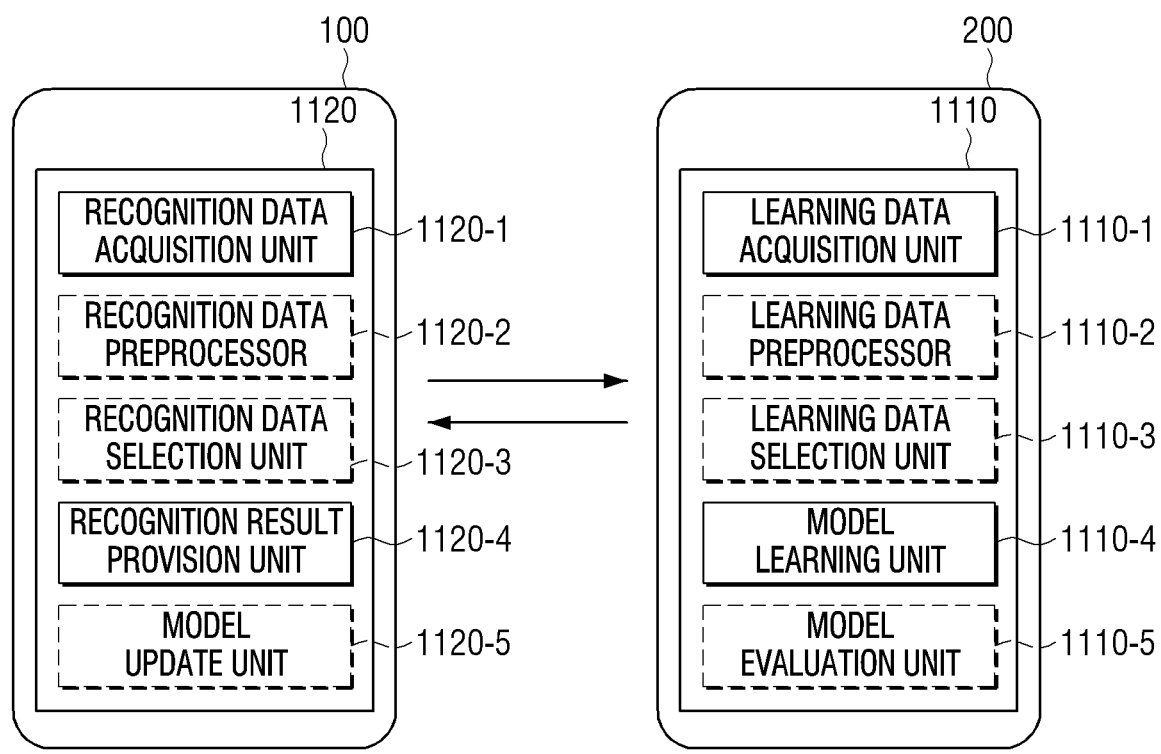
FIG. 12 is a diagram illustrating an example of learning and recognizing data through linkage between a cleaning robot 100 and a server 200 according to an embodiment.

FIG. 12 is a view illustrating an example of learning and recognizing data by interlocking the cleaning robot 100 and the server 200 according to an embodiment.

Referring to FIG. 12, the server 200 may learn a criterion for identifying a situation, and the cleaning robot 100 may identify a situation based on the learning result by the server 200.

In this case, the model learning unit 1110-4 of the server 200 can perform the function of the learning unit 1110 shown in FIG. 11B. That is, the model learning unit 1110-4 of the server 200 may learn criteria regarding which objet image, object information, context information should be used to identify a situation and how to identify a situation using the aforementioned data.

The recognition result provision unit 1120-4 of the cleaning robot 100 applies the data selected by the recognition data selection unit 1120-3 to the recognition model generated by the server 200 to obtain object information or a search category. Alternatively, the recognition result provision unit 1120-4 of the cleaning robot 100 may receive the recognition model generated by the server 200 from the server 200, and identify a situation using the received recognition model. The recognition result provision unit 1120-4 of the cleaning robot 100 may apply the object image selected by the recognition data selection unit 1120-3 to the recognition model received from the server 200 to identify object information corresponding to the object image. The recognition result provision unit 1120-4 may identify context information and a search category to obtain a search result using at least one of context information.

Figure 13:
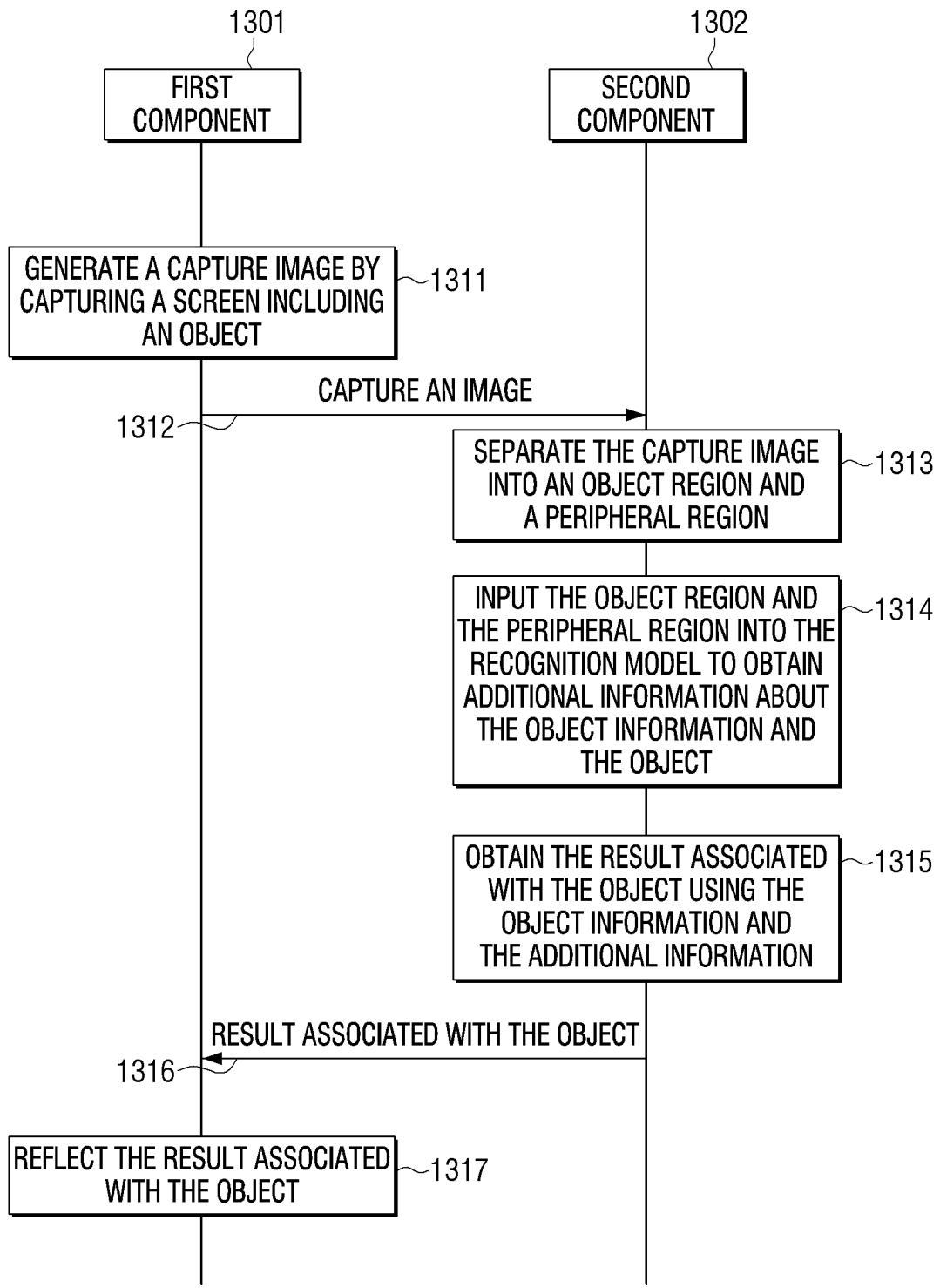
FIG. 13 is a flowchart of a network system using a recognition model according to an embodiment.

FIG. 13 is a flowchart of a network system using a recognition model according to an embodiment.

A first component 1301 may be an electronic device A, and a second component 1302 may be the server 200 in which the recognition model is stored. The first component 1301 may be a general purpose processor, and the second component 1302 may be an AI-dedicated processor. Alternatively, the first component 1301 may be at least one application, and the second component 1302 may be an operating system (OS). The second component 1302 may be a component that is more integrated and dedicated, and has less delay, better performance, or larger resources than the first component 1301 and may be a component that can rapidly and effectively process many calculations required for generating, updating, or applying the data recognition model than the first component 1301.

Referring to FIG. 13, the first component 1301 may capture a surrounding environment including the object to generate a captured image (1311). The first component 1301 may transmit the capture image to the second component 1302 (1312). The first component 1301 may transmit information about an object region corresponding to the object selected with the capture image.

The second component 1302 may separate the received capture image into an object region and a peripheral region (1313). The second component 1302 may separate the object region and the peripheral region based on information about the received object region.

The second component 1302 may input the separated object region and the peripheral region into the recognition model to obtain additional information about the object information and the object (1314). The second component 1302 may obtain object information by inputting the object region to the object recognition model, and may input the peripheral region to the peripheral information recognition model to obtain additional information for the object. The second component 1302 may determine the search category and the priority of the search category based on the object information and additional information about the object.

The second component 1302 may obtain the result associated with the object using the obtained object information and the additional information (1315). The second component 1302 may obtain the result associated with the object by applying the object information and the additional information as input data to the recognition model. The second component 1302 may obtain the result by using the search category together. The second component 1302 may obtain the result by using additional data (e.g., the risk of obstacles, importance with respect to the user of obstacles) in addition to the object information and the additional information. The additional data may be transmitted from the first component 1301 or other elements or stored in the second component 1302.

When the second component 1302 transmits the result associated with the object to the first component 1301 (1316), the first component 1301 may reflect the result associated with the received object to the moving path plan of the cleaning robot (1317).

Figure 14:
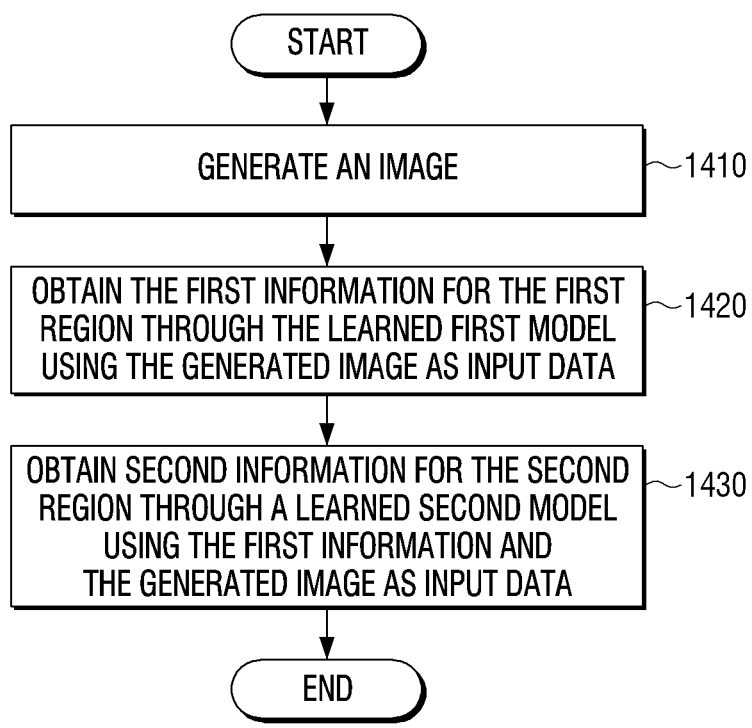
FIG. 14 is a flowchart illustrating an embodiment of providing a search result for a first region using a recognition model by the cleaning robot according to an embodiment.

FIG. 14 is a flowchart illustrating an embodiment of providing a search result for a first region using a recognition model by the cleaning robot according to an embodiment.

Referring to FIG. 14, the cleaning robot 100 may capture a surrounding environment and generate an image (1410). The cleaning robot 100 may obtain the first information for the first region through the learned first model using the generated image as input data (1420). The first model may be stored in the cleaning robot 100, but this is only one embodiment and may be stored in an external server.

The cleaning robot 100 may obtain second information for the second region through a learned second model using the first information and the generated image as input data (1430). The second model may be stored in the cleaning robot 100, but this is only one embodiment and may be stored in an external server.

When the first model and the second model are stored on the external server, the cleaning robot 100 may transmit the generated image to the external server, and receive the first information obtained by inputting the image from the external server into the first model and the second information obtained by inputting the first information to the second model.

As described above, information about the first region may be obtained more accurately by obtaining second information for the second region around the first region as well as the first information for the first region where the user input is detected.

FIG. 15 is a flowchart of a system using a recognition model according to an embodiment.

Referring to FIG. 15, the cleaning robot 100 may capture a peripheral environment to generate an image (1510). The cleaning robot 100 may obtain first information for the first region through a learned first model using the generated image as input data (1520).

The cleaning robot (100) may transmit the generated image and the first information to the server 200 (1530).

The server 200 may obtain second information for the second region through the learned second model using the first information and the generated image as input data (1540).

The server 200 may search information related to the first region based on the first information and the second information (1550).

The server 200 may transmit a search result related to the first region to the cleaning robot 100 (1560), and the cleaning robot 100 may provide a received search result (1570).

In the above embodiment, the operation of obtaining the first information through the first model for recognizing the object is performed by the cleaning robot 100, and the operation of obtaining the second information through the second model for estimating context information may be performed by the server 200. In other words, an object recognition operation capable of performing information with a small throughput may be performed by the cleaning robot 100, and a context estimation operation requiring a lot of throughput may be performed by the server 200.

In the embodiment of FIG. 15, one server 200 may obtain the first information or the second information through the learned model and search information related to the first region, but it is only one embodiment, and the plurality of servers may perform the above-described operations. The first server may obtain the first information and the second information through the learned model, and the second server may search information related to the first region based on the first information obtained from the first server and the second information. This is only one embodiment, and all procedures performed on the server 200 may be performed on the cleaning robot 100.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A control method of a robot, the method comprising:
capturing an image;
obtaining a first image which segments a floor surface from the image;
recognizing a type of obstacle included in the image using a trained first artificial intelligence model;
identifying an access forbidden region based on the type of the obstacle;
obtaining and storing a second image for the robot to perform a task by overlapping the access forbidden regions-region on the first image; and
moving the robot based on the second image,
wherein a size of the access forbidden region is identified based on the type of the obstacle and a size of the obstacle,
wherein identifying the access forbidden region comprises determining a boundary of the forbidden access region as a predetermined multiple of a dimension of the obstacle, wherein the predetermined multiple is based on the type of obstacle, and
wherein the moving the robot comprises, until a distance between the robot and the access forbidden region reaches within a predetermined first distance, moving at a first speed, and based on the distance between the robot and the access forbidden region being smaller than the predetermined first distance, moving at a second speed less than the first speed.

2. The method of claim 1, further comprising:
obtaining moving state information and capturing direction information of the robot which captures an image,
wherein the storing further comprises storing the moving state information and the direction information together with the second image.

3. The method of claim 2, further comprising:
identifying a distance between the robot and a wall using the second image and the moving state information.

4. The method of claim 3, further comprising:
determining a moving speed of the robot based on the distance to the wall.

5. The method of claim 2, further comprising:
generating a navigation map of a movable region of the robot using the second image stored together with the moving state information and the capturing direction information.

6. The method of claim 5, further comprising:
identifying a position of a robot and establishing a moving plan using the navigation map and the second image stored together with the capturing direction information.

7. The method of claim 1, wherein the obtaining the first image comprises obtaining the first image using a second artificial intelligence model trained to detect a floor surface region in the image.

8. The method of claim 1, wherein a size of the region including the obstacle varies according to a type of an obstacle recognized by the first artificial intelligence model.

9. The method of claim 1, further comprising:
obtaining a depth map image including depth information of the captured image;
obtaining and storing a third image for the robot to perform a task based on the depth map image and information about a region including the recognized obstacle; and
moving the robot based on the third image.

10. The method of claim 1, wherein the forbidden access region is based on a space occupied by the obstacle as shown in the captured image.

11. A robot for cleaning, comprising:
a camera;
a driver;
a memory; and
a processor configured to:
control the camera to capture an image, obtain a first image which segments a floor surface from the image,
recognize a type of obstacle included in the image using a trained first artificial intelligence model and identifying an access forbidden region based on the type of obstacle,
obtain and store a second image for the robot to perform a task by overlapping the access forbidden region on the first image and, wherein a size of the access forbidden region is identified based on the type of obstacle and a size of the obstacle, and
control the driver to move the robot based on the second image,
wherein the processor determines a boundary of the forbidden access region as a predetermined multiple of a dimension of the obstacle, wherein the predetermined multiple is based on the type of obstacle, and
wherein the processor controls the driver to, until a distance between the robot and the access forbidden region reaches within a predetermined first distance, move at a first speed, and based on the distance between the robot and the access forbidden region being smaller than the predetermined first distance, move at a second speed less than the first speed.

12. The robot of claim 11, wherein the robot further comprises:
a sensor,
wherein the processor is further configured to, based on obtaining moving state information and capturing direction information of the robot which captures an image through the sensor, store the moving state information and the direction information together with the second image in the memory.

13. The robot of claim 12, wherein the processor is further configured to identify a distance between the robot and a wall using the second image and the moving state information.

14. The robot of claim 13, wherein the processor is further configured to determine a moving speed of the robot based on the distance to the wall.

15. The robot of claim 12, wherein the processor is further configured to generate a navigation map of a movable region of the robot using the second image stored together with the moving state information and the capturing direction information and store the same in the memory.

16. The robot of claim 15, wherein the processor is further configured to identify a position of a robot and establish a moving plan using the navigation map and the second image stored together with the capturing direction information.

17. The robot of claim 11, wherein the processor determines the type of obstacle from a plurality of categories.

18. The robot of claim 11, wherein the processor determines the forbidden access region based on a space occupied by the obstacle as shown in the captured image.

* * * * *